(12) United States Patent
Naizer et al.

(10) Patent No.: US 9,285,260 B2
(45) Date of Patent: Mar. 15, 2016

(54) APPARATUS AND METHODS FOR MEASURING AND OR ADJUSTING THE HEIGHT OF MATERIAL IN THE BIN OF A HOPPER ASSEMBLY

(71) Applicant: Baker Hughes Incorporated, Houston, TX (US)

(72) Inventors: Brent Naizer, Tomball, TX (US); Jay D. Jordan, College Station, TX (US); Patrick Thomson, College Station, TX (US); Zheng Chen, Tomball, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 158 days.

(21) Appl. No.: 14/039,980

(22) Filed: Sep. 27, 2013

(65) Prior Publication Data
US 2014/0041730 A1 Feb. 13, 2014

Related U.S. Application Data

(63) Continuation-in-part of application No. 13/740,835, filed on Jan. 14, 2013, which is a continuation-in-part of application No. 13/568,468, filed on Aug. 7, 2012, now Pat. No. 9,038,865.

(51) Int. Cl.
*G01F 23/284* (2006.01)
*G01F 13/00* (2006.01)

(52) U.S. Cl.
CPC ............ *G01F 23/284* (2013.01); *G01F 13/003* (2013.01); *Y10T 137/0324* (2015.04)

(58) Field of Classification Search
CPC .......... G01F 13/003; F16P 3/16; B65G 43/00
USPC ......... 73/866, 866.5, 290 R; 414/723; 33/719
See application file for complete search history.

(56) References Cited

U.S. PATENT DOCUMENTS

| | | | |
|---|---|---|---|
| 4,343,092 A * | 8/1982 | Wahl | G01B 7/06 33/834 |
| 2008/0179054 A1 | 7/2008 | McGough et al. | |
| 2008/0179324 A1 | 7/2008 | McGough et al. | |

* cited by examiner

*Primary Examiner* — Laura Martin
*Assistant Examiner* — Jean Morello
(74) *Attorney, Agent, or Firm* — E. Randall Smith; Jones & Smith, LLP

(57) ABSTRACT

At least one probe assembly is used to measure the height of material dispensed into the bin of a hopper assembly.

22 Claims, 18 Drawing Sheets

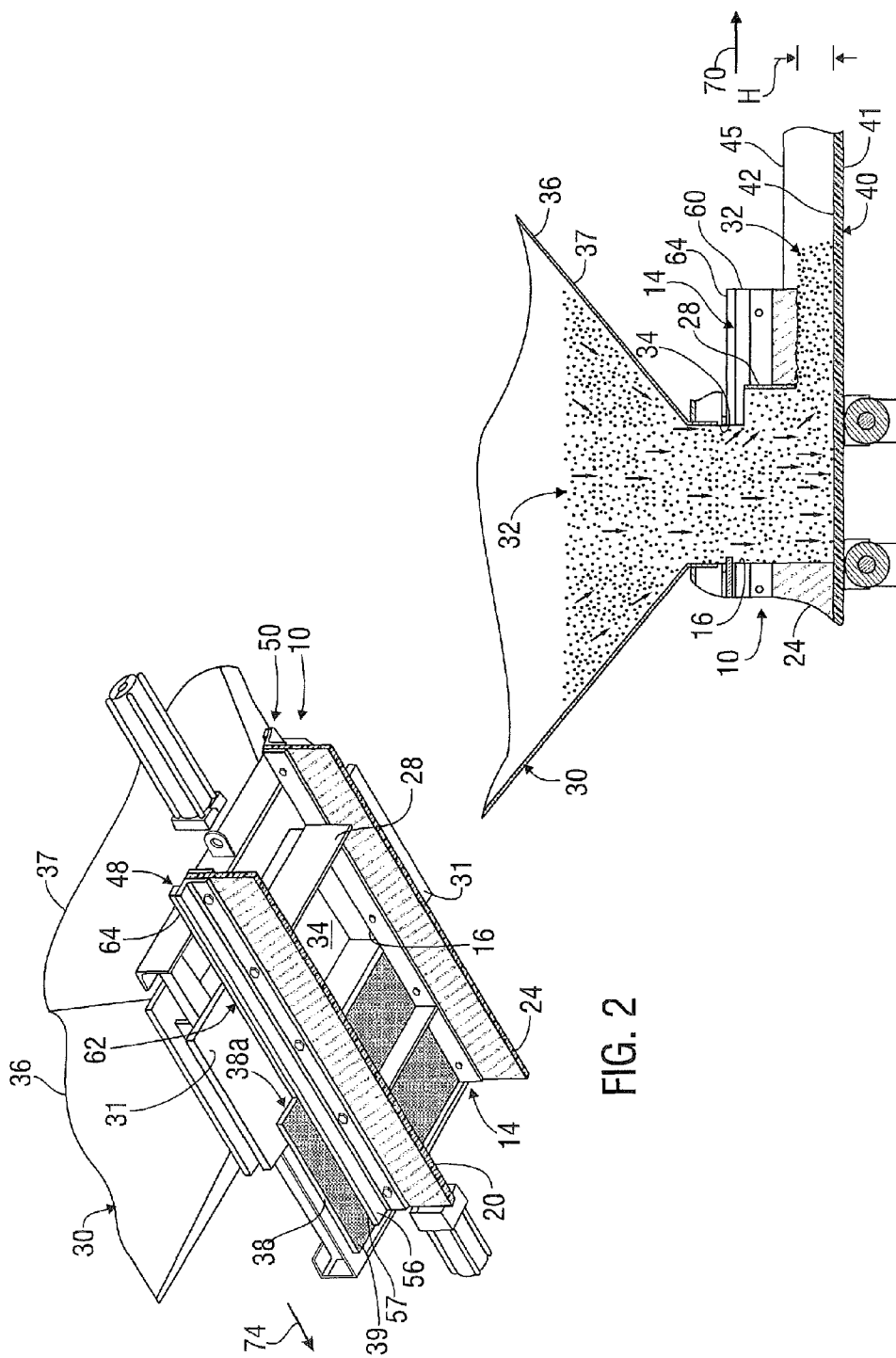

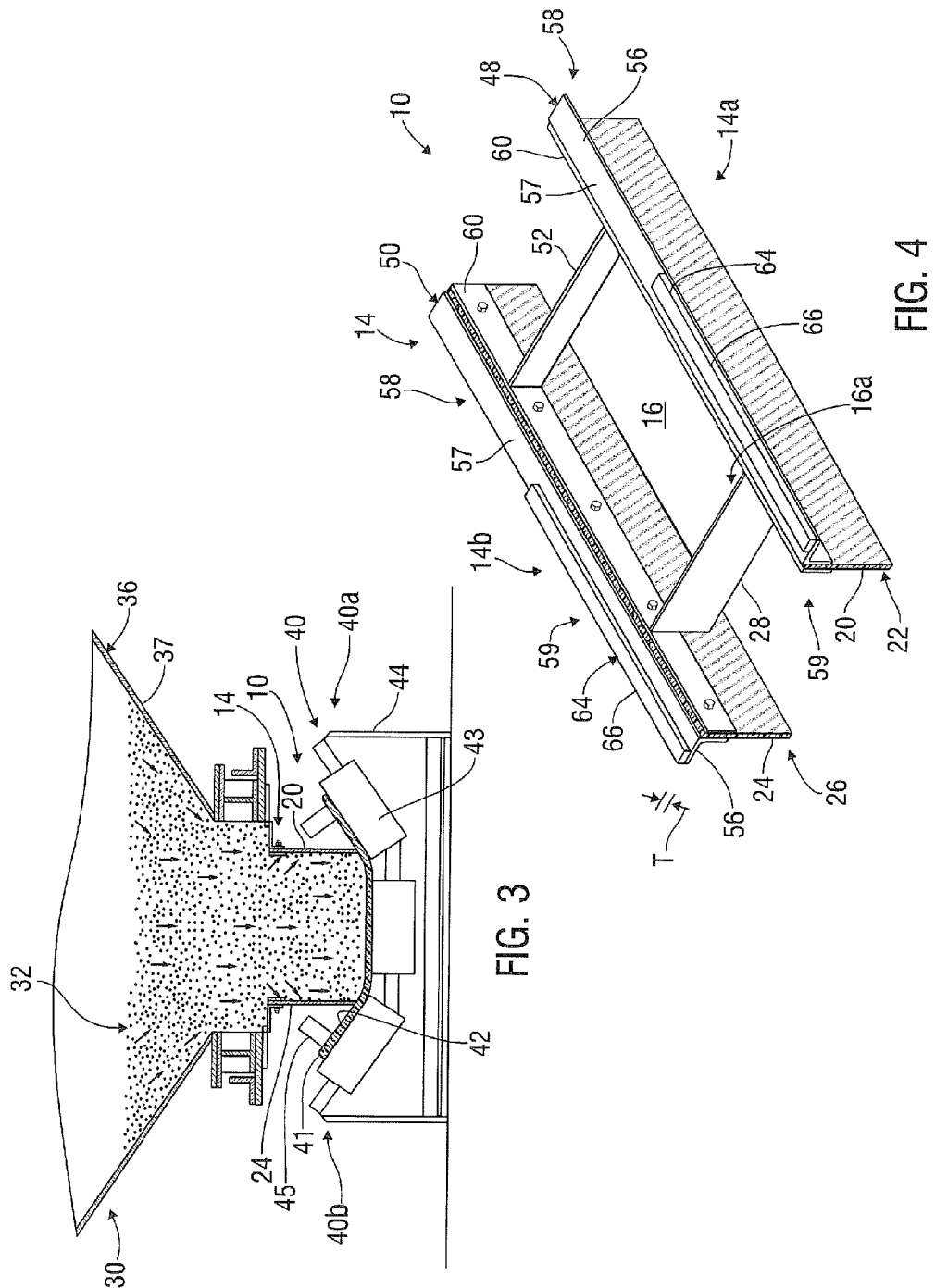

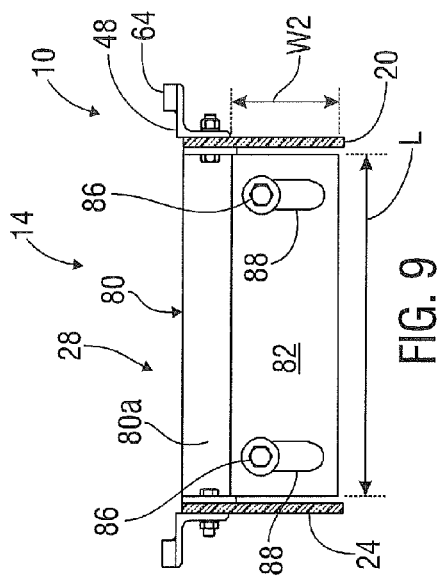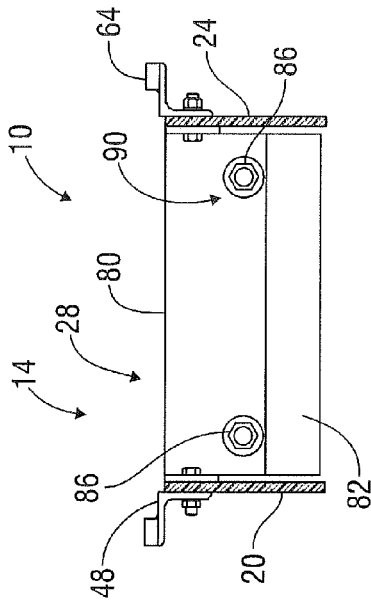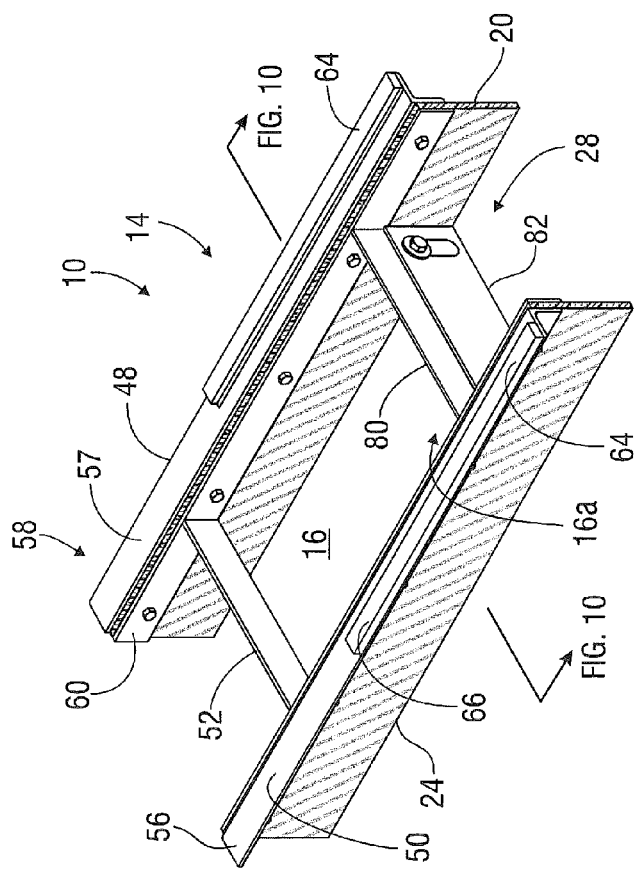

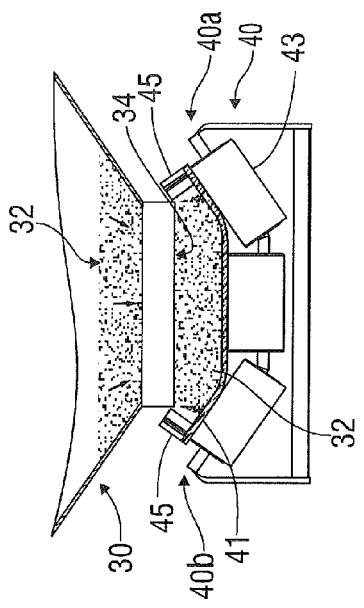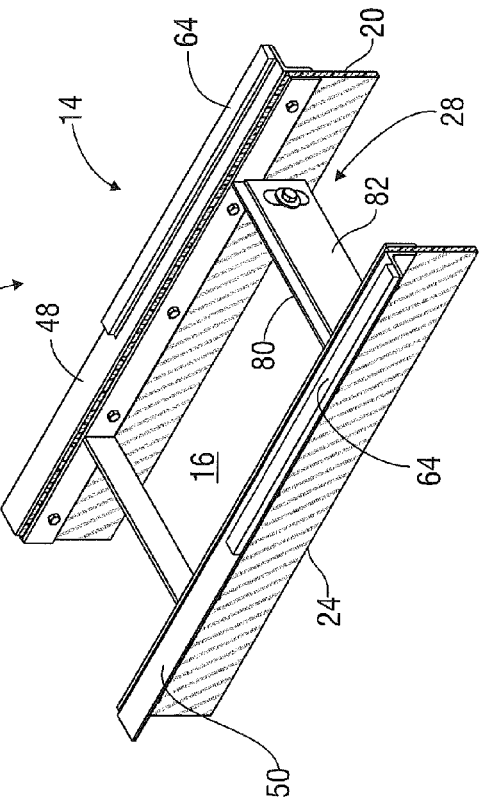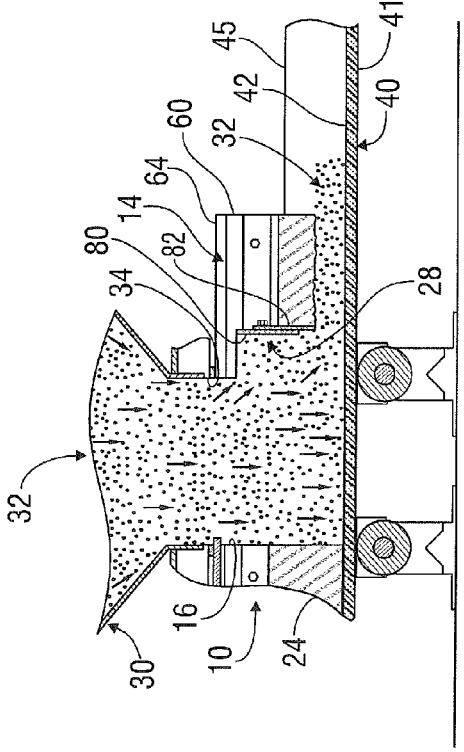

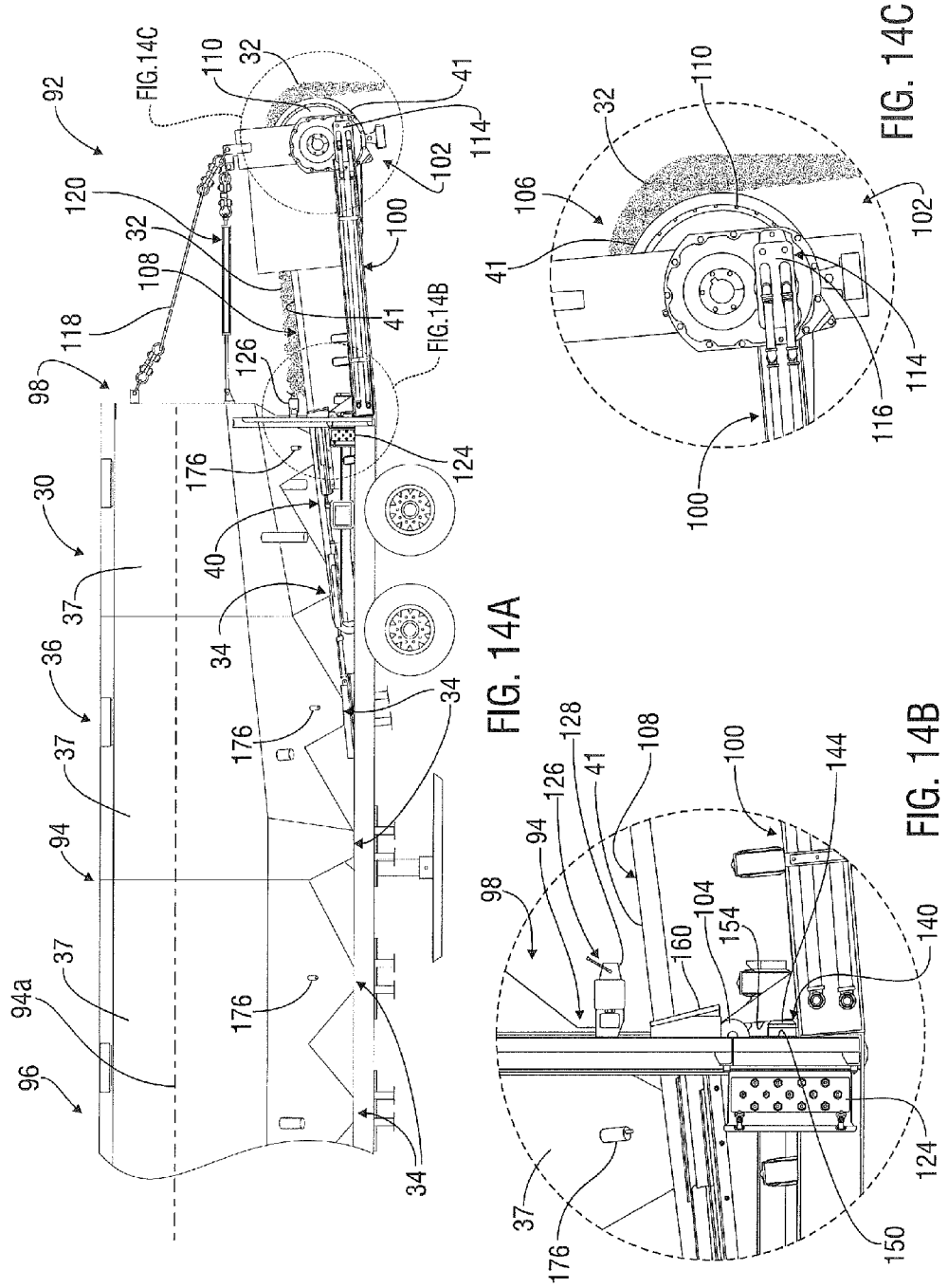

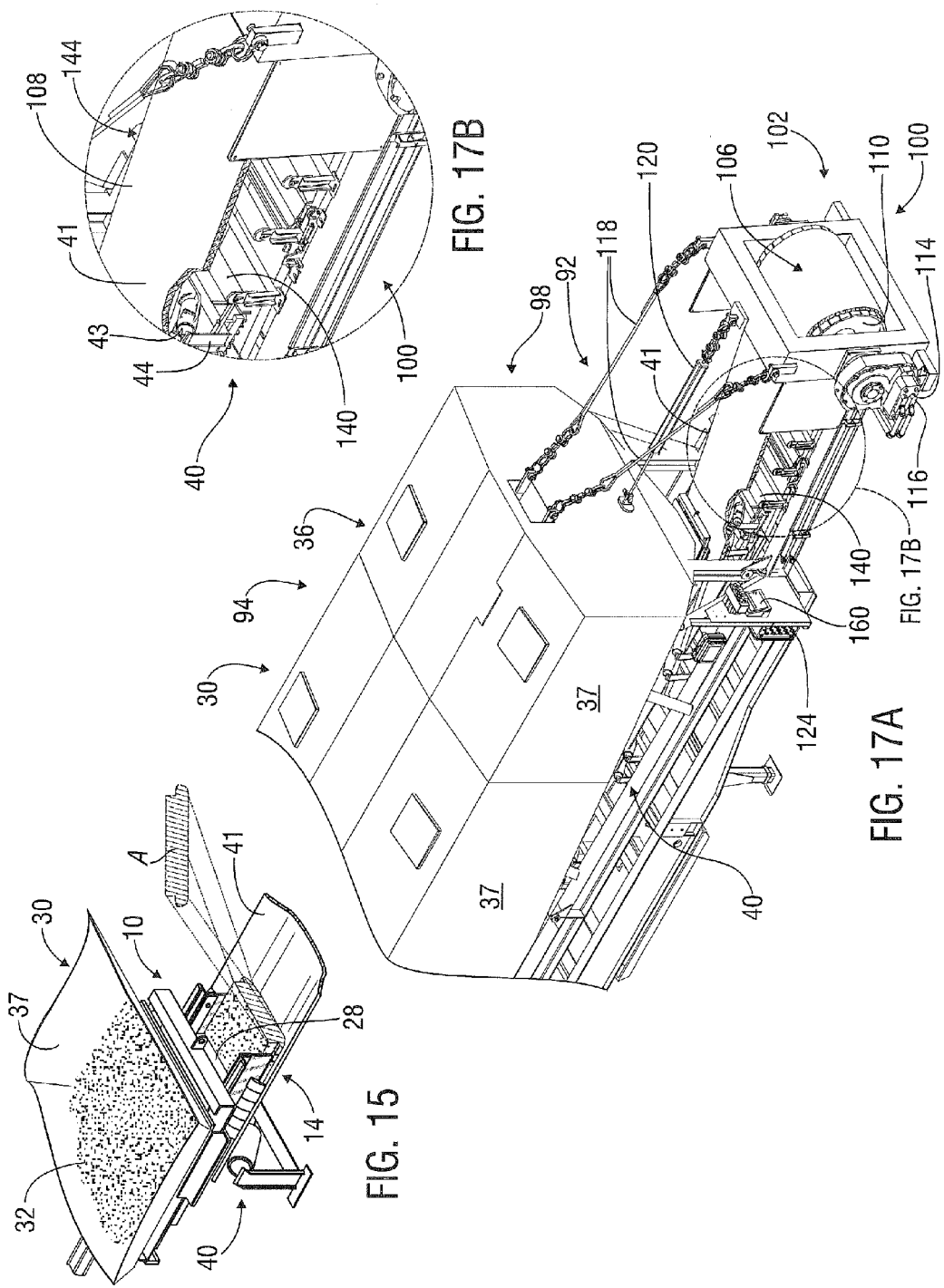

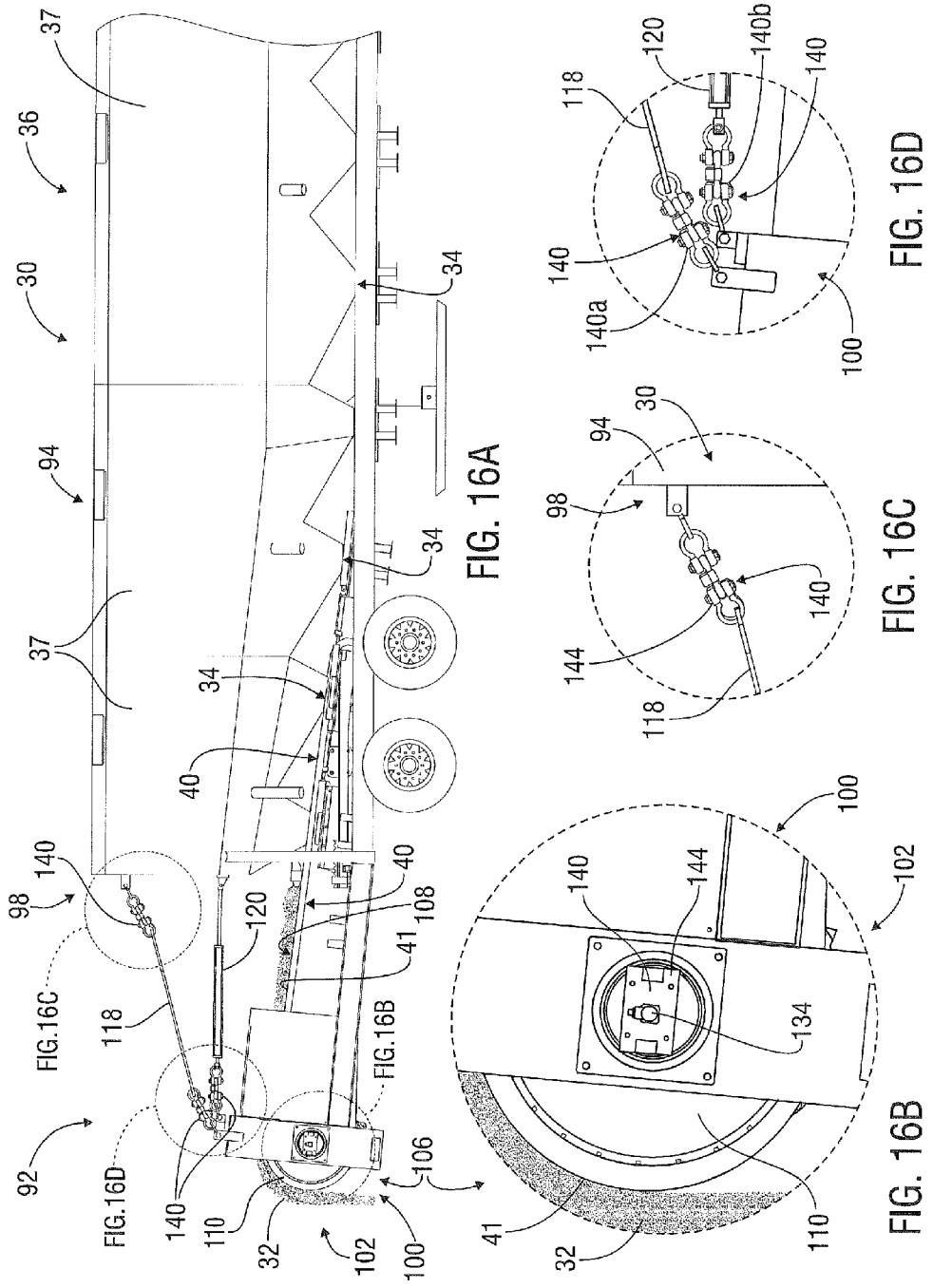

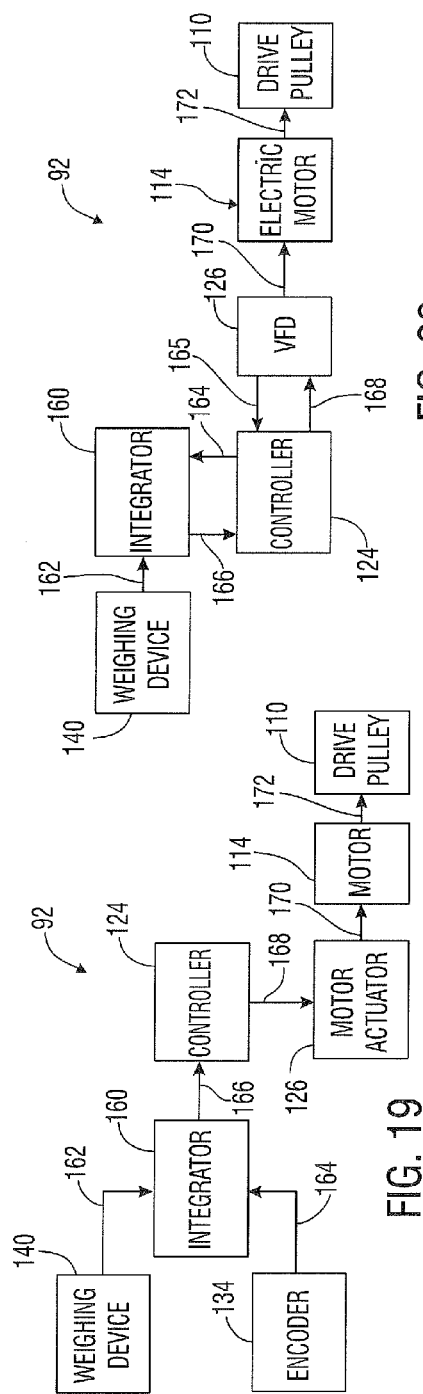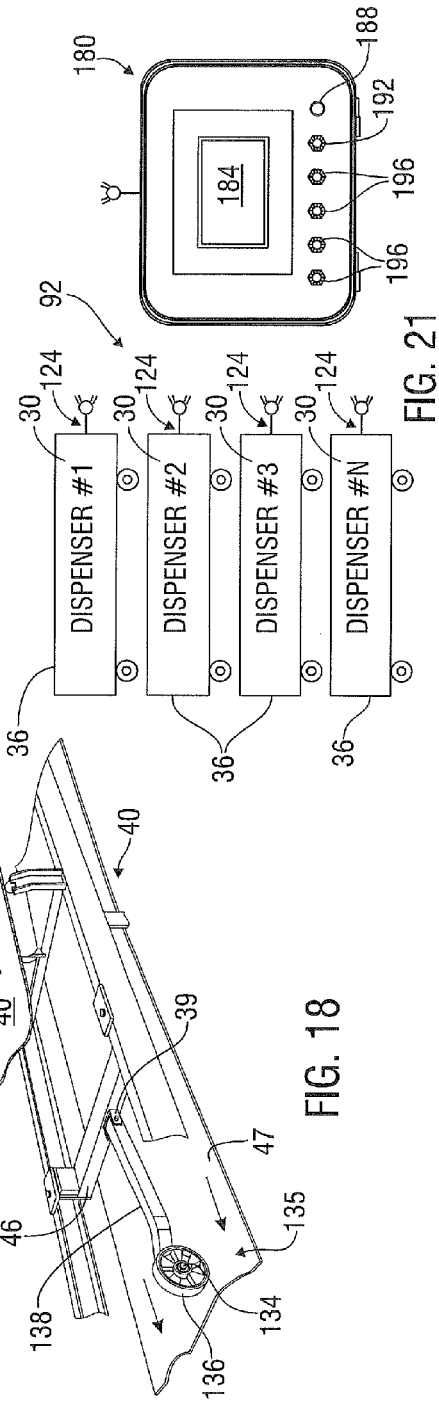

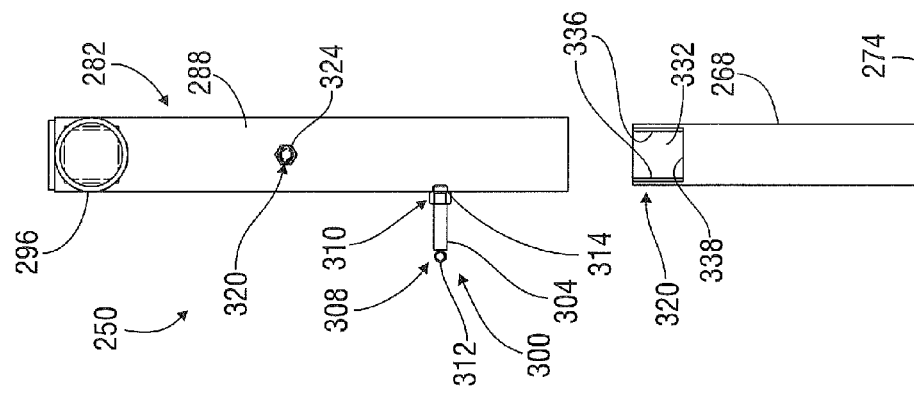
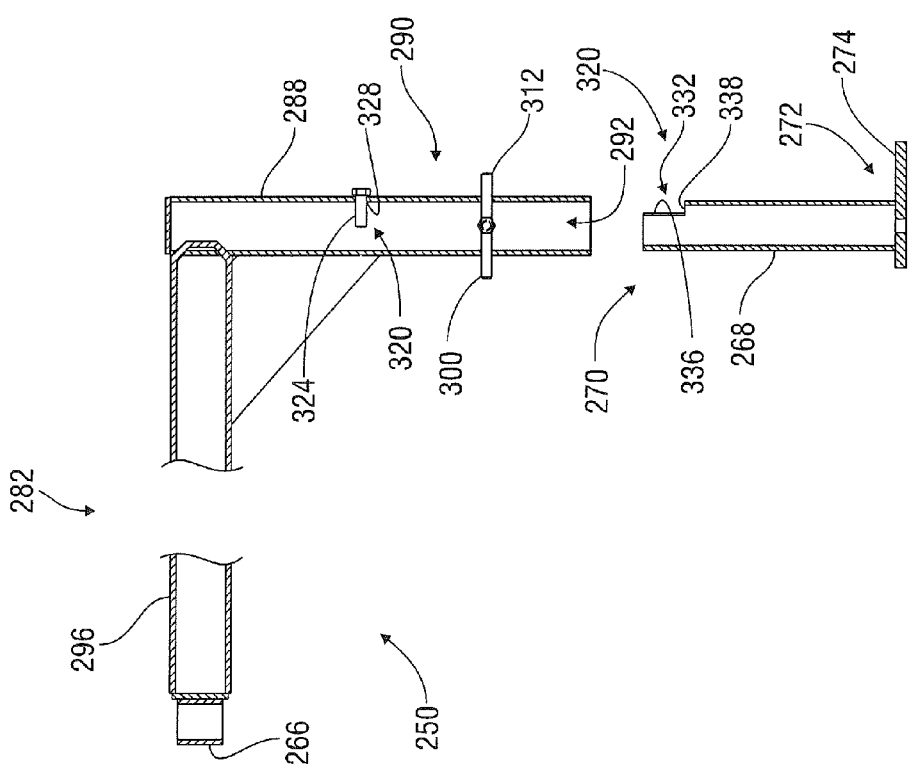

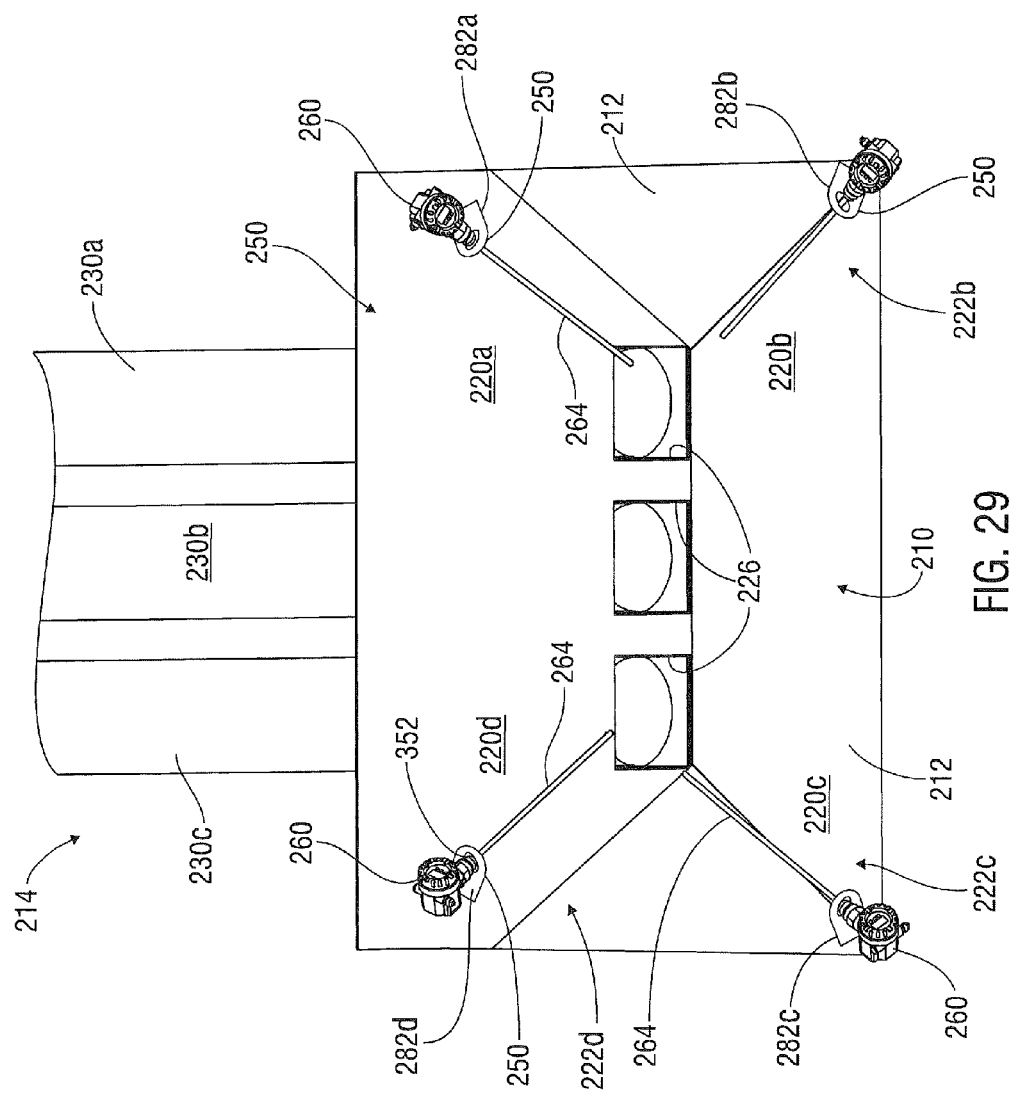

APPARATUS AND METHODS FOR MEASURING AND OR ADJUSTING THE HEIGHT OF MATERIAL IN THE BIN OF A HOPPER ASSEMBLY

This application is a continuation-in-part of and claims priority to U.S. patent application Ser. No. 13/740,835 filed Jan. 14, 2013, entitled "Apparatus and Methods for Assisting in Controlling Material Delivered On a Conveyor", which is a continuation-in-part of U.S. patent application Ser. No. 13/568,468 filed Aug. 7, 2012, entitled "Apparatus and Methods for Assisting in Controlling the Discharge of Material Onto a Conveyor From a Dispenser", both of which are hereby incorporated by reference herein in their entireties.

FIELD OF THE INVENTION

The present disclosure relates generally to material delivery and conveyance technology and, more particularly, to apparatus and methods for measuring and/or adjusting the height of material in the bin of a hopper assembly.

BACKGROUND OF THE INVENTION

Various industries involve the delivery and use of specific materials, such as dry solids. Presently known systems and techniques for delivering and using specialized materials may have one or more drawbacks. For example, as illustrated in FIG. 1, the material 32 being discharged from a material storage/dispensing unit 30 onto a conveyor 40 often overflows off the sides of the conveyor 40. Depending upon the particular application, material overflow can freeze the conveyor belt from moving, make it difficult or impossible to determine or control the rate of discharge of material from the conveyor to the desired destination or cause other unwanted consequences.

Various existing systems and techniques attempt to determine, control or affect the amount of material being discharged from the material storage/dispensing unit. In hydraulic fracturing operations, for example, the dry solids are often proppant or sand delivered from a material storage/dispensing unit to a blender unit, where it is mixed in pre-determined proportions with one or more liquids and/or chemicals. The mixture is typically then delivered to a pumping unit and pumped into the well under high pressure on a continuing basis for a period of time. Some systems attempt to determine the amount of material discharged by calculating the loss of weight of the entire material storage unit after material is dispensed onto the conveyor. Depending upon the application, such techniques may be cumbersome, inaccurate or cause other undesirable consequences. Other techniques involve running the conveyor very fast and frequently varying the open position of the discharge gates on the material dispenser, which are believed to often be inaccurate, cumbersome or cause other undesirable consequences.

In many operations, it is desirable to measure and/or maintain the level of material dispensed into the hopper bin of one or more piece of equipment. Some existing techniques attempting to measure and/or maintain the material level in a blender unit hopper bin require a first person positioned near the blender unit to visually monitor the height of the material in the bin and signal a second person at the material storage/delivery unit to increase or decrease the supply of material to the blender unit. The presence of these personnel near the equipment (in the United States) currently requires a third person, a health/safety/environmental (HSE) monitor, also on site. This technique may also be inaccurate, cumbersome and cause other unwanted consequences, such as material overflowing at the blender unit.

It should be understood that the above-described features and examples are provided for illustrative purposes only and are not intended to limit the scope or subject matter of the appended claims or those of any related patent application or patent. None of the appended claims or claims of any related application or patent should be limited by the above discussion or construed to address, include or exclude each or any of the cited examples, features and/or disadvantages, merely because of the mention thereof herein.

Accordingly, there exists a need for improved systems, apparatus and methods useful to assist in determining and/or adjusting the height of material in a hopper bin having one or more of the attributes or capabilities described or shown in, or as may be apparent from, the other portions of this patent.

BRIEF SUMMARY OF THE DISCLOSURE

In some embodiments, the present disclosure involves systems for estimating or determining the height of material dispensed into the bin of a hopper assembly at any among a plurality of locations within the bin. These systems include at least one probe assembly, an upwardly-extending, elongated base and a probe carrier. The probe assembly includes at least one measuring rod useful to measure the height of material in the bin. The lower end of the base is coupled to the hopper assembly in a manner that allows the base to be non-moveable relative to the bin. The probe carrier includes an elongated body and an elongated arm extending laterally outwardly therefrom and over the bin. The elongated arm is configured to carry at least one probe assembly so that the measuring rod thereof extends downwardly therefrom into the bin. The elongated body has a tubular lower portion slideably engaged with the elongated base and being selectively rotatable relative thereto. Rotation of the elongated body causes the elongated arm to pivot relative to the elongated base over the bin and reposition the measuring rod in any among a plurality of positions relative to the bin.

In many embodiments, the present disclosure involves a system for simultaneously determining the height of material dispensed into the bin of a hopper assembly in up to four different regions of the bin. The system includes four probe assemblies and four probe carriers. Each probe assembly has at least one measuring rod useful to measure the height of material in the bin. The first probe carrier is coupled to the hopper assembly proximate to the first region of the bin and configured to hold the first probe assembly in a fixed position relative to the bin so that the measuring rod thereof is disposed at a desired location in the first region of the bin and configured to measure the height of material therein. The second probe carrier is coupled to the hopper assembly proximate to the second region of the bin and configured to hold the second probe assembly in a fixed position relative to the bin so that the measuring rod thereof is disposed at a desired location in the second region of the bin and configured to measure the height of material therein. The third and fourth probe carriers are similarly arranged with respect to the respective third and fourth regions of the bin.

In various embodiments, the present disclosure involves a method of estimating or determining the height of material in the bin of a hopper assembly of a hydraulic fracturing fluid blending unit as the material is being dispensed into the bin from another device during material delivery operations at a work site. The method includes positioning the other device adjacent to the bin and securing the respective positions of the other device and the blending unit. At least one radar-guided probe assembly is selectively positioned over the bin so that the measuring rod of the probe assembly extends into the bin at a desired location. Material is provided into the bin from the other device on an ongoing basis. As material is being provided into the bin, the probe assembly continually measures the height of the material in the bin. The probe assembly repeatedly communicates the material height measurements to an electronic controller.

There are embodiments of the present disclosure that involve a method of maintaining the height of material in the bin of a hopper assembly as the material is being dispensed into the bin during material delivery operations at a work site. The material is provided off the end of at least one conveyor belt from a material dispenser and either directly into the bin or into one or more device that ultimately dispenses the material into the bin. The method includes at least one probe assembly associated with the bin measuring the height of the material in the bin. The material height measurement is electronically communicated to at least one electronic controller. At least one electronic controller compares the material height measurement to a desired target height level of material in the bin. If the material height measurement is less than the desired target height level, at least one electronic controller reduces the amount of material discharged off the end of the conveyor belt. If the material height measurement is greater than the desired target height level, at least one electronic controller increases the amount of material discharged off the end of the conveyor. The above actions are repeated on an ongoing basis during the material delivery operations.

Accordingly, the present disclosure includes features and advantages which are believed to enable it to advance material delivery technology. Characteristics and advantages of the present disclosure described above and additional features and benefits will be readily apparent to those skilled in the art upon consideration of the following detailed description of various embodiments and referring to the accompanying drawings.

BRIEF DESCRIPTION OF THE DRAWINGS

The following figures are part of the present specification, included to demonstrate certain aspects of various embodiments of this disclosure and referenced in the detailed description herein:

FIG. 2 is a perspective view of an embodiment of a discharge control device in accordance with the present disclosure shown in a flow-open position relative to an exemplary material dispenser;

FIG. 3 is a rear view in partial cross-section of the exemplary discharge control device of FIG. 2 shown engaged with a material dispenser that is dispensing material onto a conveyor;

FIG. 4 is a perspective view of the exemplary discharge control device of FIG. 2;

FIG. 5 is a side view in partial cross-section of the exemplary discharge control device of FIG. 2 shown engaged with a material dispenser that is dispensing material onto a conveyor;

FIG. 8 is a perspective view of another embodiment of a discharge control device in accordance with the present disclosure;

FIG. 9 is a front view of the discharge control device of FIG. 8;

FIG. 10 is a cross-sectional view of the discharge control device of FIG. 8 taken along lines 10-10;

FIG. 11 is a side view in partial cross-section of the exemplary discharge control device of FIG. 8 shown engaged with a material dispenser that is dispensing material onto a conveyor;

FIG. 12 is a perspective view of the discharge control device of FIG. 8 showing the exemplary wiper extension in a different position;

FIG. 13 is a rear view in partial cross-section of a material dispenser that is dispensing material onto a conveyor with the dispenser opening positioned below the side walls of the conveyor;

FIG. 14A is a partial side view of an exemplary material dispenser having an embodiment of a material discharge metering system associated therewith in accordance with the present disclosure;

FIG. 14B is an exploded view of a portion of the material dispenser and material discharge metering system of FIG. 14A;

FIG. 14C is an exploded view of another portion of the material dispenser and material discharge metering system of FIG. 14A;

FIG. 15 is a partial perspective view of the material dispenser and exemplary discharge control device shown in FIG. 11;

FIG. 16A is a partial side view of the other side of the exemplary material dispenser and material discharge metering system of FIG. 14A;

FIG. 16B is an exploded view of a portion of the material dispenser and material discharge metering system of FIG. 16A;

FIG. 16C is an exploded view of another portion of the material dispenser and material discharge metering system of FIG. 16A;

FIG. 16D is an exploded view of another portion of the material dispenser and material discharge metering system of FIG. 16A;

FIG. 17A is a partial perspective view of an exemplary material dispenser having another embodiment of a material discharge metering system associated therewith in accordance with the present disclosure;

FIG. 17B is an exploded view of a portion of the material dispenser and material discharge metering system of FIG. 18A;

FIG. 18 is a perspective view of an exemplary floating wheel assembly that can be used with a material discharge metering system in accordance with an embodiment of the present disclosure;

FIG. 19 is a flow diagram illustrating the process performed by an embodiment of a material discharge metering system in accordance with the present disclosure;

FIG. 20 is a flow diagram illustrating the process performed by another embodiment of a material discharge metering system in accordance with the present disclosure;

FIG. 21 is a system diagram including an embodiment of a material discharge metering system used with multiple material dispensers and having an exemplary remote control device;

FIG. 27 is a partial cross-sectional view of the material height measurement system of FIG. 26 shown at least partially disassembled;

FIG. 28 is a rear view of the material height measurement system of FIG. 27;

FIG. 29 is a top view of another embodiment of a material height measurement system shown mounted upon a hopper assembly in accordance with the present disclosure;

DETAILED DESCRIPTION OF PREFERRED EMBODIMENTS

Figure 1:
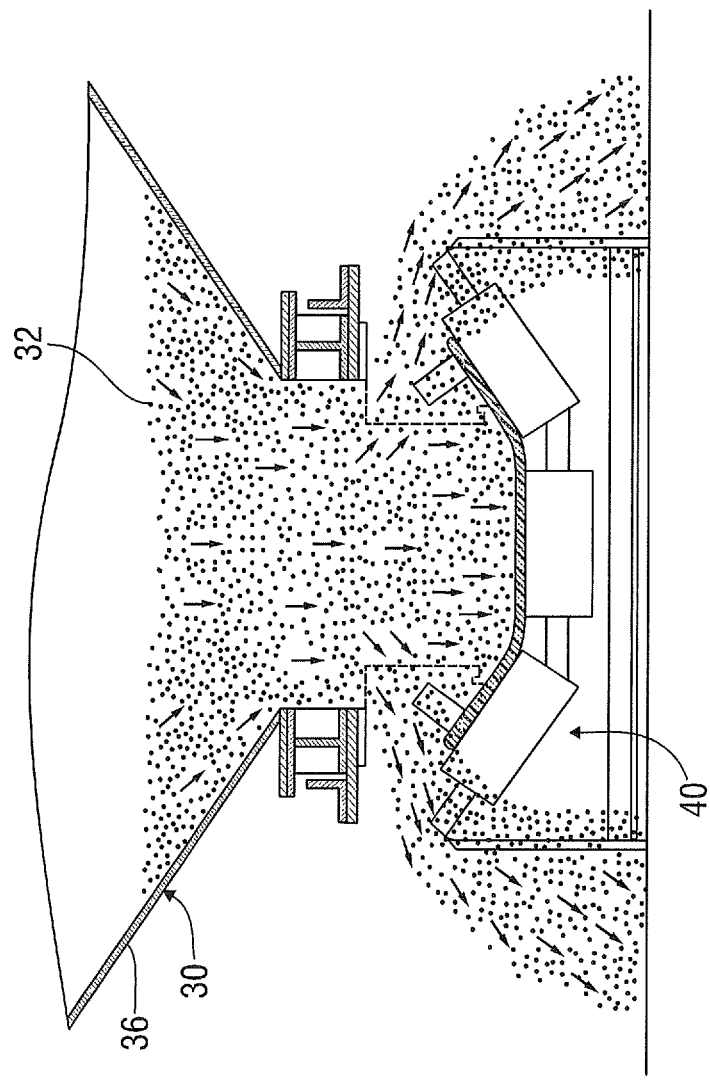
FIG. 1 is a rear view in partial cross-section of a prior art material dispenser shown dispensing material onto a conveyor.

Characteristics and advantages of the present disclosure and additional features and benefits will be readily apparent to those skilled in the art upon consideration of the following detailed description of exemplary embodiments of the present disclosure and referring to the accompanying figures. It should be understood that the description herein and appended drawings, being of example embodiments, are not intended to limit the claims of this patent or any patent or patent application claiming priority hereto. On the contrary, the intention is to cover all modifications, equivalents and alternatives falling within the spirit and scope of the claims. Many changes may be made to the particular embodiments and details disclosed herein without departing from such spirit and scope.

In showing and described preferred embodiments in the appended figures, common or similar elements are referenced with like or identical reference numerals or are apparent from the figures and/or the description herein. The figures are not necessarily to scale and certain features and certain views of the figures may be shown exaggerated in scale or in schematic in the interest of clarity and conciseness.

As used herein and throughout various portions (and headings) of this patent application, the terms "invention", "present invention" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference. The terms "coupled", "connected", "engaged" and the like, and variations thereof, as used herein and in the appended claims are intended to mean either an indirect or direct connection or engagement. Thus, if a first device couples to a second device, that connection may be through a direct connection, or through an indirect connection via other devices and connections.

Certain terms are used herein and in the appended claims to refer to particular components. As one skilled in the art will appreciate, different persons may refer to a component by different names. This document does not intend to distinguish between components that differ in name but not function. Also, the terms "including" and "comprising" are used herein and in the appended claims in an open-ended fashion, and thus should be interpreted to mean "including, but not limited to . . . ." Further, reference herein and in the appended claims to components and aspects in a singular tense does not necessarily limit the present disclosure or appended claims to only one such component or aspect, but should be interpreted generally to mean one or more, as may be suitable and desirable in each particular instance.

Referring to FIG. 2, in accordance with an embodiment of the present disclosure, a discharge control device 10 is shown. In this example, the discharge control device 10 includes a carrier 14, first and second side restrictors 20, 24 and at least one wiper 28. The illustrated carrier 14 is associated with a material dispenser 30, which is used to dispense material 32 (FIG. 3) onto one or more conveyors 40 (FIG. 3). The exemplary carrier 14 is configured to be positioned below at least one dispenser opening 34 of the material dispenser 30 and above the conveyor 40 (FIG. 3), and includes at least one carrier opening 16 alignable below the dispenser opening(s) 34.

The material 32 may be any type of solids, or solid-liquid combination that can be discharged onto a conveyor 40. Some examples of materials 32 are dry solids, sand, proppant and dry additives, such as soy gum. The material dispenser 30 may be any type of device or system that can be used to dispense material 32 onto a conveyor 40. An example material dispenser 30 is a mobile sand conveying or storage unit 36 used in the oilfield industry, such as the Sand King or Frac Master by National Oilwell Varco, used on-site at drilling locations. For example, the mobile sand conveying unit 36 may be used to deliver proppant or sand to the well site. Typically, the mobile sand conveying unit 36 dispenses the proppant onto a moving conveyor belt for delivery to another component, such as a blender. A typical sand conveying unit 36 includes one or more hoppers having multiple material storage compartments 37 and multiple dispenser openings 34 associated therewith. A hydraulically-driven steel plate, or gate, 38 is laterally movable below each dispenser opening 34 to allow the discharge of material 32 therethrough. For example, the sand conveying or storage unit 36 may have four distinct compartments 37, three compartments with two dispenser openings 34 and associated gates 38 each and a fourth compartment with three dispenser openings 34 and associated gates 38. Some other examples of material dispensers 30 are horizontal and vertical sand silos, hopper systems or other equipment useful for discharging material onto one or more conveyor 40, and may be non-mobile or mounted on trailers or vehicles, stimulation vessels or other off-shore equipment.

Likewise, the conveyor 40 may be any type of device or system that receives material 32 and delivers it to another location. For example, as shown in FIG. 3, the conveyor 40 may be a conventional conveyor belt system, typically including a belt 41 having a conveying surface 42 and side walls 45, multiple idler rollers 43 and a framework 44. However, the present disclosure and appended claims are not limited by the type, form, configuration, operation or other details of the material 32, material dispenser 30 or conveyor 40.

Referring now to FIG. 4, the illustrated side restrictors 20, 24 extend downwardly from the carrier 14 and longitudinally at least partially along opposing respective sides 14a, 14b thereof. As shown in FIG. 3, the illustrated side restrictors 20, 24 are capable of preventing material 32 from substantially overflowing off the corresponding respective sides 40a, 40b of the conveyor 40 as the material 32 is being dispensed thereon from the material dispenser 30. Referring back to FIG. 4, if included, the exemplary wiper 28 extends downwardly from the carrier 14 and perpendicular or transverse to the side restrictors 20, 24 at the front end 16a of the carrier opening 16. As shown in FIG. 5, the wiper 28 is capable of generally leveling the height H of the material 32 being dispensed onto the conveyor 40.

Figure 6:
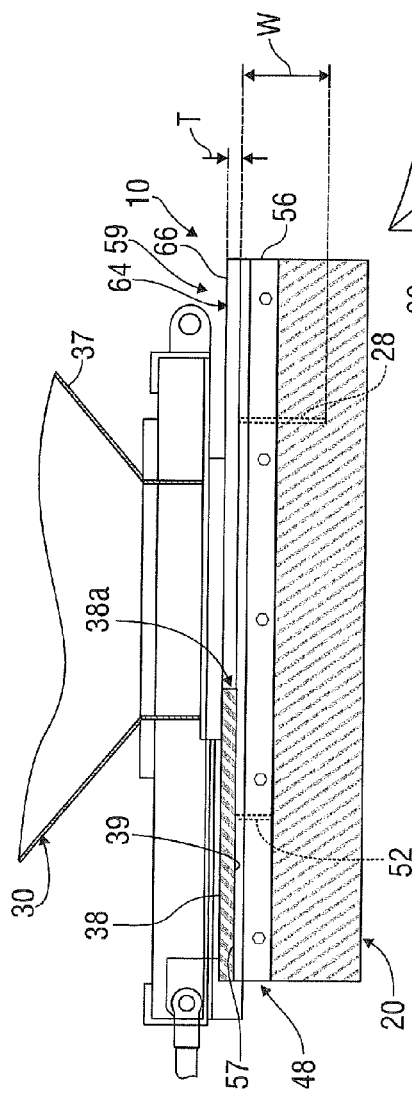
FIG. 6 is a side view of the exemplary discharge control device of FIG. 2.

Still referring to FIG. 4, the carrier 14 may have any suitable form, configuration and operation. For example, the carrier 14 may include left and right side rails 48, 50 connected together with at least one cross bar 52 and engageable with the first and second side restrictors 20, 24 and wiper(s) 28 (see also FIG. 6). In the illustrated embodiment, the side rails 48, 50 each include an elongated angle iron 56 and corresponding elongated metal plate 60, which are bolted, or otherwise fastened, together over the proximal, or top, end of the corresponding side restrictor 20 or 24. The illustrated cross bar 52 and wiper 28 are connected with the side rails 48, 50, such as by weld, and the space between them forms the carrier opening 16. In other embodiments, more than one cross bar 52 and/or wiper 28 may be included and may form more than one carrier opening 16.

The carrier 14 may be associated with the material dispenser 30 in any suitable manner. Referring back to FIG. 2, in this embodiment, the carrier 14 is associated with the material dispenser 30 by being connected to and movable with the gate 38. For example, the upper surface 57 (FIG. 4) of the rear section 58 of each angle iron 56 may be mounted flush against the bottom 39 of the gate 38, such as by weld or other connection method. The remainder of the exemplary carrier 14 extends forward of the front 38a of the gate 38. The illustrated carrier 14 thus slides between positions along with movement of the gate 38. In this arrangement, as the gate 38 is moved rearward (arrow 74) relative to the dispenser opening 34, the carrier opening 16 becomes aligned under the dispenser opening 34.

Still referring to FIG. 2, if desired, a gap filler 64 may be included to fill all, or part of, the gap 62 that would exist between each side rail 48, 50 and the bottom surface(s) 31 of the material dispenser 30 adjacent to the dispenser opening 34 and forward of the gate 38. This may be useful, for example, to prevent the leakage or escape of material 32 through the gap 62. For example, a gap filler 64 may be provided on the front section 59 (FIG. 4) of each angle iron 56. The gap filler 64 may have any suitable form and configuration. In this embodiment, as shown in FIG. 4, each gap filler 64 is a flat bar 66 welded to the top surface of the front section 59 of each angle iron 56 and has a thickness T approximately equal to the thickness of the gate 38 (see FIG. 6). The illustrated flat bars 66 lie flush against the bottom surface 31 of the dispenser 30 adjacent to the dispenser opening 34. In other embodiments, for example, the gap filler 64 may instead be an integral part of the side rails 48, 50.

The side restrictors 20, 24 may have any suitable form, configuration and operation. In this embodiment, the side restrictors 20, 24 are positioned and sized so that, during use, they extend to, and contact, the conveying surface 42 (FIG. 3) of the conveyor 40 at a desired location on the width thereof. Depending upon the particular application, the side restrictors 20, 24 may be useful to prevent material 32 from overflowing off the respective sides of the conveyor 40 as the material 32 is being dispensed thereon, assist in preventing wind or other external influences from disturbing the desired discharge and distribution of material 32 onto the conveyor 40, help establish a uniform volume of material 32 being discharged onto the conveyor 40, one or more other purpose, or a combination thereof.

The exemplary side restrictors 20, 24 are constructed of flexible material (e.g. elastomeric material), such as to prevent damage to the conveyor 40 due to contact therewith. In other embodiments, only a portion of the side restrictors 20, 24, such as the lower ends 22, 26 (FIG. 4), respectively, may be constructed of flexible material. In yet other embodiments, the side restrictors 20, 24 may not be configured to extend all the way to the conveying surface 42 of the conveyor 40 and may not be constructed of flexible material. For example, the side restrictors 20, 24 may be constructed of steel or any other desired material. Thus, the side restrictors 20, 24 may be designed to extend to any desired height over the conveyor 40. Likewise, the side restrictors 20, 24 may be designed to be positioned, during use, at any desired locations relative to the width of the conveyor 40. For example, in some applications, it may be desirable to retain the material 32 within a narrow width section on the conveying surface 42 of the conveyor 40. In some embodiments, the carrier 14 may be configured so that the position of one or both side restrictors 20, 24 is adjustable, such as to be able to adjust the position of the side restrictors 20, 24 relative to the conveyor 40.

The wiper 28 may likewise have any suitable form, configuration and operation. In this embodiment, the wiper 28 is a steel plate having (i) a length that substantially corresponds with the width section of the conveyor 40 upon which the material 32 will be dispensed, and (ii) a width W (FIG. 6) so that it extends down from the carrier 14 to a desired height H (FIG. 5) over the conveyor 40. The illustrated wiper 28 is configured so that, during operation, it will level off the top of the material 32 after it is dispensed from the material dispenser 30 and as the conveyor 40 moves in the direction of arrow 70. The exemplary wiper 28 is thus configured to establish a maximum height H of the material 32 on the conveying surface 42 of the conveyor 40. Depending upon the particular application, the wiper 28 may be useful to help establish a uniform volume of material 32 being discharged onto the conveyor 40, assist in preventing material overflow from the conveyor 40, one or more other purpose, or a combination thereof. For some types of materials 32, as the conveyor 40 continues to move in the direction of arrow 70, the material 32 may remain at height H based upon the self-bridging principal of sand.

In some embodiments, the carrier 14 may be configured so that the position of the wiper 28 is adjustable, such as to allow selection of the profile or height of the material 32 on the conveyor 40, to select or change the volume of output onto the conveyor 40, assist in preventing spillage of material 32 from the conveyor or other desired purpose. In the embodiment of FIG. 8, for example, the wiper 28 includes a wiper base 80 and an adjustable wiper extension 82 that extends downwardly from the wiper base 80 to allow selective adjustment of the height H (FIG. 11) of the wiper 28 over the conveyor 40 and, consequently, the height H of the material 32 on the conveying surface 42.

The wiper base 80 and extension 82 may have any suitable form, configuration and operation. In the embodiment of FIG. 8, the wiper base 80 and extension 82 are each steel plates that extend downwardly from the carrier 14 and perpendicular or transverse to the side restrictors 20, 24 at the front end 16a of the carrier opening 16. The exemplary wiper base 80 is connected with the side rails 48, 50, such as by weld. The illustrated extension 82 is movable up and down relative to the base 80.

Referring to FIG. 9, the illustrated wiper extension 82 is aligned over the front 80a of the wiper base 80, but may instead be aligned over the back of the wiper base 80. The length L of the exemplary extension 82 is the same as the length of the wiper base 80, but could instead be formed with a different length, or have different portions with differing lengths. The illustrated extension 82 may have any desired width W2.

In this embodiment, the wiper base 80 and extension 82 are releasably connected together with one or more connectors 86, each movable between fully engaged and non-fully engaged positions. Each exemplary connector 86 extends through an elongated slot 88 formed in the wiper extension 82 and an anchor hole 90 (FIG. 10) formed in the wiper base 80. Any suitable connector(s) 86 may be used. In this example, the connectors 86 are bolts. When fully engaged, the illustrated connectors 86 secure the position of the extension 82 relative to the wiper base 80 for operation of the discharge control device 10. When in a non-fully engaged position, the connectors 86 allow the extension 82 to be moved up and down relative to the wiper base 80 within the range of travel of the connector(s) 86 in the slot(s) 88.

Referring to FIG. 11, in this embodiment, the extension 82 will level off the top of the material 32 after it is dispensed from the material dispenser 30 and as the conveyor belt 41 moves in the direction of arrow 70. The exemplary wiper extension 82 thus serves to establish the maximum height H of the material 32 on the conveying surface 42 of the conveyor 40. The repositioning of the exemplary extension 82 relative to the base 80 allows adjustment of the height H of the wiper 28 relative to the conveyor 40. For example, the height H of the wiper 28 may be adjusted to the desired height when setting up the discharge control device 10 for operation. In FIGS. 8-11, for example, the extension 82 is in its lowermost position relative to the wiper base 80, establishing the shortest height H of the wiper 28 over the conveyor 40 and the shortest height H of the material 32 on the conveyor 40. In contrast, in FIG. 12, the exemplary extension 82 is secured in a higher position relative to the wiper base 80, which will position the wiper 28 higher over the conveyor (not shown) and allow material 32 to form on the conveyor 40 at a greater height. The adjustability of the illustrated extension 82 thus allows selection of the profile or height of the material 32 on the conveyor 40, such as to change the volume of output onto the conveyor 40, prevent spillage of material 32 from the conveyor or other desired purpose.

Figure 7:
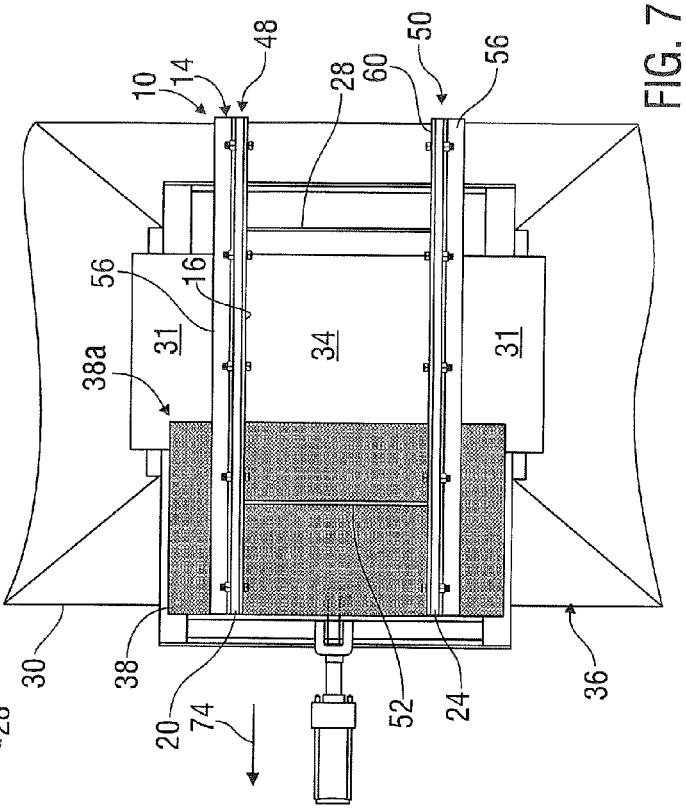
FIG. 7 is a bottom view of the exemplary discharge control device of FIG. 2.

An example operation of the discharge control device 10 of FIG. 2 will now be described. Referring to FIG. 7, the gate 38 of the material dispenser 30 is opened, causing the exemplary carrier 14 to be moved into position between the dispenser opening 34 and conveyor 40 (FIG. 5). As shown in FIG. 5, material 32 is then discharged from the material dispenser 30 through the opening 34 and through the carrier opening 16. As the material 32 passes through the carrier opening 16 and onto the conveying surface 42 of the conveyor belt 41, the illustrated side restrictors 20, 24 prevent at least substantial overflow of material off the sides 40a, 40b (FIG. 3) of the conveyor 40. If included, the gap fillers 64 prevent leakage of material 32 through the gap 62 (FIG. 2). As desired, the conveyor belt 41 is moved in the direction of arrow 70. Concurrently with the movement of the conveyor belt 41, the wiper 28 levels off the top of the material on the conveying surface 42 at height H. Since material provided onto the conveyor 40 is at least substantially retained on the conveyor belt 41 with the use of the exemplary carrier 14, the amount of material 32 retained on the conveyor 40 may be at least substantially known. If desired, the gate 38 of the material dispenser 30 may be moved to a fully open position and the dispenser opening 34 retained in a fully open state.

There may be other applications in which material 32 provided onto the conveyor 40 may be at least substantially retained on the conveyor 40 without the use of the discharge control device 10. For example, in the embodiment of FIG. 13, the dispenser opening 34 of the material dispenser 30 is shown positioned in close proximity to the conveyor belt 41. In this example, the side walls 45 of the conveyor 40 extend upwardly above the height of the dispenser opening 34, helping prevent (at least substantial) overflow of material off the sides 40a, 40b of the conveyor 40. In such instances, the amount of material 32 retained on the conveyor 40 may be at least substantially known.

Referring now to FIG. 14A, in another independent aspect of the present disclosure, when the amount of material 32 retained on the conveyor 40 is least substantially known (with or without the use of the discharge control devices 10 of FIGS. 2-12), the quantity and/or rate of material 32 being discharged off, or delivered by, the conveyor 40 may, if desired, be measured and/or controlled. In some embodiments, controlling the quantity or rate of material 32 discharged off, or delivered by, the conveyor 40 may be accomplished by controlling and, if necessary, varying the speed of the conveyor 40, the rate the material 32 is dispensed from the material dispenser 30 onto the conveyor 40, any other suitable manner or a combination thereof. Controlling the discharge rate or volume of material 32 off the conveyor 40 may be useful, for example, to improve the efficiency and effectiveness of the overall material delivery operation, optimize or improve equipment performance or other reasons. In many applications, for example, the conveyor 40 may be moved slowly and often returned to a stop, while efficiently delivering the desired volume of material 32.

In the embodiment of FIG. 14A, the material dispenser 30 is a mobile sand conveying unit 36. However, any other type of material dispenser 30 may be used. The illustrated material dispenser 30 is shown having a main body 94 that includes multiple material storage compartments 37 and associated dispenser openings 34 aligned along a longitudinal axis 94a of the main body 94 between its front and rear ends 96, 98. The dispenser openings 34 are aligned over the conveyor 40 so that material 32 may be dispensed from each compartment 37 onto the conveyor belt 41. An elongated stinger 100, at least one cable 118 and at least one stinger lifting arm 120 are shown extending from the rear end 98 of the main body 94. The cable 118 may, for example, be a safety cable and the lifting arm 120, when included, may be a hydraulic RAM used to raise and lower the stinger 100. It should be noted that some dispensers 30 may have more than one or no cables 118 or lifting arms 120.

The illustrated stinger 100 is pivotably moveable about at least one hinge 104 (FIG. 14B) relative to the main body 94 between at least one retracted position (not shown) and at least one extended position (shown). As shown in FIG. 14C, the exemplary conveyor belt 41 extends over the illustrated stinger 100 to its discharge end 106, which is located at the far end 102 of the stinger 100. At its discharge end 106, the illustrated belt 41 wraps around at least one discharge drum, or drive pulley 110. The exemplary drive pulley 110 drives the movement of the conveyor belt 41. Thus, the speed of movement the conveyor belt 41 is directly affected by the speed of rotation of the drive pulley 110. In this embodiment, at least one motor 114 drives the pulley 110. The aforementioned components of the material dispenser 30 of FIGS. 14A-C and further details of their form, configuration and operation are known in the art. Moreover, the present disclosure is not limited to use with the exemplary material dispenser 30 of FIGS. 14A-C and may be used with any other type of material dispenser 30 having some or all of the same or similar components as described above, or different components.

Referring still to FIGS. 14A-C, in accordance with various embodiments of the present disclosure, a material discharge metering system 92 includes an electronic controller 124 (FIG. 14B) configured to assist in measuring and/or controlling the amount of material 32 discharged off the end 106 of the conveyor belt 41. The electronic controller 124 may have any suitable form, configuration and operation. For example, the controller 124 may be a programmable logic controller (PLC), as is and become known.

It should be noted that while the present disclosure discusses the discharge of material 32 off the discharge end 106 of the conveyor belt 41, the material discharge metering system 92 is not so limited. The system 92 and all the features and methods herein may also be used when the material 32 is delivered by the conveyor 40 in any other manner. For example, the present disclosure is not limited to situations where the material 32 is discharged off the end 106 of the conveyor belt 41, but may instead by discharged off another part of the conveyor belt 41, removed from the conveyor belt 41 (and thus not necessarily discharged off the belt 41) or otherwise delivered by the conveyor belt 41. As used herein, the terms "end", "discharge end" and "discharge point" of the conveyor belt, as well as variations thereof, mean the end 106 of the conveyor belt 41 and any other locations of, or areas on, the conveyor belt 41 from which material 32 is discharged, removed or otherwise delivered.

Referring now to FIGS. 16A-D, the exemplary material discharge metering system 92 may be configured to determine the actual rate of discharge (or amount) of material 32 off the discharge end 106 of the conveyor belt 41 (the "Actual Discharge Rate"). The "Actual Discharge Rate" also encompasses the actual rate of discharge of material 32 off any other part of the conveyor belt 41, as well as the actual rate of delivery of material 32 by the conveyor belt 41. Any suitable technique may be used to determine the Actual Discharge Rate. In the embodiment of FIGS. 16A-B, for example, at least one encoder 134 is included. The encoder(s) 134 may have any suitable form, configuration, operation and location. In this example, the encoder 134 is located at the axle point of the drive pulley 110 (FIG. 16B) and configured to measure its speed of rotation in rotations per minute (RPM) and provide readings to the controller 124 and/or one or more other components. One example of a presently commercially available encoder 134 that may be used in the material discharge metering system 92 is the ES20 sold by BEI ENCODERS under model number ES200234-600.

If desired, the Actual Discharge Rate may be calculated or estimated by the controller 124 or other suitable component using any suitable formulae. In one example of a material discharge metering system 92 (e.g. FIGS. 16A-D) used with a material dispenser 30 having a discharge control device 10 (e.g. FIG. 15), the Actual Discharge Rate may be calculated in pounds per minute (PPM) with the formula:

$$PPM = \frac{(\text{Max}RPM)(PPR)}{PPU}$$

Max RPM=maximum rotations per minute of drive pulley 110
PPR=pulses per revolution of encoder 134

$$PPU = \text{pulses per unit} = \frac{PPR}{(VPR)(D)}$$

VPR=volume per revolution=(C×A)
C=circumference of drive pulley 110=2Πr
A=planar area between conveyor belt 41 and wiper 28 (FIG. 15)
D=bulk density of material For example, if the diameter of the drive pulley is 18 inches, its circumference C is 56.54 inches, or 4.71 Ft. The planar area A (FIG. 15) between the exemplary conveyor belt 41 and wiper 28, may be calculated using computer modeling, as is and becomes known. If A=0.6 Ft$^2$, then VPR is $$(4.71 \text{ Ft})(.6 \text{ Ft}^2) = \left(2.827 \frac{\text{Ft}^3}{REV}\right).$$

If the encoder 134 produces 600 pulses per revolution (PPR) and the bulk density D of the material 32 is 100 pounds per cubic foot, then:

$$PPU = \frac{\left(600\frac{\text{PULSE}}{REV}\right)}{\left(2.827\frac{\text{Ft}^3}{REV}\right)\left(100\frac{\text{LBS}}{\text{Ft}^3}\right)} = \frac{\left(600\frac{\text{PULSE}}{REV}\right)}{\left(282.7\frac{\text{Ft}^3}{REV}\right)}$$

If the maximum speed of the drive pulley 110 (e.g. obtained with a tachometer) (Max RPM) is 141 RPM, the Max RPM and PPU values can be input into the controller 124 (or other component) to determine the amount of material 32 discharged off the conveyor 40 (at max speed) in pounds per minute:

$$PPM = \frac{\left(141\frac{REV}{\text{MIN}}\right)\left(600\frac{\text{PULSE}}{REV}\right)}{\left(2.122\frac{\text{PULSE}}{\text{LBS}}\right)} = 39,868.04\frac{\text{LBS}}{\text{MIN}}$$

In another example, If A=0.467 Ft$^2$, then $$VPR = (4.71 \text{ Ft})(.467 \text{ Ft}^2) = \left(2.2\frac{\text{Ft}^3}{REV}\right)$$

and the following results will follow:

$$PPU = \frac{\left(600\frac{\text{PULSE}}{REV}\right)}{\left(2.2\frac{\text{Ft}^3}{REV}\right)\left(100\frac{\text{LBS}}{\text{Ft}^3}\right)} = \frac{\left(600\frac{\text{PULSE}}{REV}\right)}{\left(220\frac{\text{Ft}^3}{REV}\right)} = \left(2.73\frac{\text{PULSE}}{\text{LBS}}\right)$$

$$PPM = \frac{\left(141\frac{REV}{\text{MIN}}\right)\left(600\frac{\text{PULSE}}{REV}\right)}{\left(2.73\frac{\text{PULSE}}{\text{LBS}}\right)} = 30,989\frac{\text{LBS}}{\text{MIN}}$$

The Actual Discharge Rate in pounds per minute (PPM) may also be estimated based upon the volume per minute (VPM) of material 32 discharged off the end 106 of the conveyor belt 41 with the formulae:

VPM=(Max RPM)(VPR)

PPM=(VPM)(D)

Using the data plugged into the second example above, the estimated amount of material 32 discharged off the conveyor 40 (at max speed) in pounds per minute would be:

$$VPM = \left(141 \frac{REV}{MIN}\right)\left(2.2 \frac{Ft^3}{REV}\right) = 310.139 \frac{Ft^3}{MIN}$$

$$PPM = \left(310.139 \frac{Ft^3}{MIN}\right)\left(100 \frac{LBS}{Ft^3}\right) = 31,013.9 \frac{LBS}{MIN}$$

Knowing the Actual Discharge Rate based upon the type (bulk density) of material 32 discharged off the conveyor 40 (such as into a blender or other destination), can be used to improve overall material delivery planning, efficient supply of material 32 into the material storage compartments 37 of the material dispenser 30, or any other purpose. If desired, one or more variables may be changed to modify the Actual Discharge Rate. For example, if the discharge control device 10 includes an adjustable wiper extension 82 (e.g. FIGS. 8-12), the position of the extension 82 may be adjusted to vary the planar area A, changing the Actual Discharge Rate. For another example, the speed of the drive pulley 110 may be changed.

In other embodiments, such as shown in FIG. 18, the encoder 134(s) may be configured to more directly measure the speed of the conveyor belt 41. In this example, the encoder 134 is part of a floating wheel assembly 135 associated with the conveyor belt 41 and useful to measure the speed of the belt 41. The floating wheel assembly 135 may have any suitable components, configuration and operation. One example of a presently commercially available floating wheel assembly 135 that may be used in the material discharge metering system 92 is the Milltronics TASS sold by Siemens under model number TASS-3.

In the illustrated embodiment, the encoder 134 is disposed on, and measures the rotation of, a free-spinning wheel 136 that rests on and rotates along with movement of the conveyor belt 41. The exemplary wheel 136 is suspended from a floating arm 138 that is pivotably mounted to a structural cross-member 46 of the conveyor 40. The exemplary arm 138 engages the cross-member 46 and floats over the conveyor belt 41 via a pivot bracket assembly 139. However, the floating arm 138 may be mounted to any other suitable component and in any other suitable manner. For example, the floating arm 138 may be pivotably mounted to a static beam (not shown) of a weighing device.

In this embodiment, the encoder 134 measures the rotational speed of the wheel 136 as the wheel rotates on a return portion 47 of the conveyor belt 41. However, the wheel 136 may instead rotate on a forward-moving, or primary, portion 54 of the conveyor belt 41. The exemplary encoder 134 provides readings to the controller 124 and/or one or more other components to calculate the speed of the belt 41 based upon the rotational speed of the wheel 136. It should be noted, however, that any other suitable technique and components may be use to measure the speed of the conveyor belt 41.

It should be noted that all embodiments of the material discharge metering system 92 do not require at least one encoder 134 to measure the speed of the conveyor belt 41 or drive pulley 110. When needed or desired, the speed of the conveyor belt 41 or drive pulley 110 may be measured using any other suitable components and techniques.

Referring back to FIGS. 14A-C, in another independent aspect of the present disclosure, the controller 124 may be configured to vary the Actual Discharge Rate. In this embodiment, the electronic controller 124 can vary the speed of the motor 114 (FIG. 14C) and, thus, the speed of the drive pulley 110 and conveyor belt 41, and the amount of material 32 discharged off the end 106 of the conveyor belt 41. For example, the controller 124 may reduce power to the motor 114, slowing the drive pulley 110, conveyor belt 41 and rate of discharge of material 32 off the conveyor 40, or increase power to the motor 114 to cause the opposite results. In this embodiment, based at least partially upon the Actual Discharge Rate, the controller 124 automatically dictates the speed (increase, decrease or no change) of the motor 114. However, the controller 124 may be configured to change the speed of the motor 114 or otherwise vary the Actual Discharge Rate based upon other criteria.

The electronic controller 124 may be configured to vary the speed of the motor 114 in any suitable manner. For example, one or more motor actuator 126 (FIG. 14B) that controls the speed of the motor 114 may be included. In such instances, the system 92 may be configured so that the controller 124 communicates with the motor actuator 126 to vary or maintain the speed of the motor 114.

In the embodiment of FIGS. 14A-C, the motor 114 is a hydraulic motor 116 (FIG. 14C) and the motor actuator 126 is a hydraulic control valve 128 (FIG. 14B). The illustrated controller 124 controls the speed of the motor 116 by controlling the flow of hydraulic fluid from the valve 128 to the motor 116. In other embodiments, a similar arrangement may involve a pneumatic motor (not shown) and pneumatic control valve.

In yet other embodiments, the motor 114 is an electric motor and the motor actuator 126 may include, for example, a variable frequency drive (VFD). In such instances, the controller 124 may provide signals to the VFD to increase, decrease or maintain the speed of the motor 114. Further, in some embodiments, the VFD may (instead of or in addition to one or more encoder 134), determine the speed of the conveyor belt 41 or drive pulley 110 and provide such data to the controller 124 or other component. When included, the VFD may have any suitable form, configuration and operation. One example of a presently commercially available VFD that may be used in the material discharge metering system 92 is the SVX9000 sold by Eaton under model number SVXF0714AA. It should be noted that the present disclosure is not limited by the type of motor 114 and/or motor actuator 126. Further, multiple controllers 124, motors 116 and/or motor actuators 126 may be used.

Referring back to FIG. 14B, in some embodiments, the material discharge metering system 92 includes at least one weighing device 140 configured to determine the weight of material 32 on the conveyor belt 41. The output of the weighing device 140 can be used in determining the Actual Discharge Rate. For example, if the system 92 also determines the speed of the conveyor belt 41 or drive pulley 110, such speed data along with weight data from the weighing device 140 can be used by the controller 124 or other suitable component to determine the Actual Discharge Rate without the use of any of the above formulae.

The weighing device 140 may have any suitable form, configuration and operation sufficient to determine the weight of material 32 disposed on the conveyor belt 41. For example, the weighing device 140 may include at least one strain gage load cell 144 as is and become known. In a preferred embodiment, the weighing device 140 includes two strain gage load cells 144. Other possible example types of weighing devices 140 include load sensors and transducers.

When included, the weighing device 140 may be located at any suitable location sufficient to weigh the material 32 provided onto the conveyor belt 41 from the material dispenser 30. As shown in FIG. 14B, for example, the illustrated weighing device 140 is positioned at the "pinch point" between the stinger 100 and the main body 94 of the material dispenser 30, generally proximate to the hinge 104. Since the exemplary stinger 100 is movable about the hinge(s) 104 relative to the main body 94 of the material dispenser 30 and suspended at its far end 102, the stinger 100 will move down when material 32 passes onto or across the portion 108 of the conveyor belt 41 that extends over the stinger 100. As material 32 on the conveyor belt 41 passes over the stinger 100, the illustrated weighing device 140 will measure the change in the weight of the stinger 100. For example, the weighing device 140 may be positioned between a first surface 150 on, extending from or connected with the main body 94, and a second surface 154 on, extending from or connected with the stinger 100. As the stinger 100 drops down from the weight of the material 32 crossing over the belt portion 108, the exemplary weighing device 140 will be squeezed or pinched between the surfaces 150, 154 and take a weight measurement.

For other examples, in FIG. 16B, the illustrated weighing device 140 is engaged with (or below) the drive pulley 110 disposed at the far end 102 of the stinger 100. For example, the drive pulley 110 may be floated on the weighing device 140. As material 32 on the conveyor belt 41 passes over the drive pulley 110, the pulley 110 will drop and the weighing device 140 will take a measurement. In FIGS. 16C and 16D, weighing devices 140 are shown engaged with the cable 118 or lifting arm 120. For example, the weighing device 140 of FIG. 16C is positioned between the cable 118 and the material dispenser 30. In FIG. 16D, a first weighing device 140a is positioned between the cable 118 and the stinger 100, and a second weighing device 140b is positioned between the lifting arm 120 and the stinger 100. When the stinger 100 is in an extended position (such as shown), the illustrated cable 118 and lifting arm 120 are generally in tension between the main body 94 of the material dispenser 30 and the far end 102 of the stinger 100. As material 32 passes onto or over the end 102 of the stinger 100, downward pulling forces will be placed on the cable 118 and lifting arm 120, at which time the respective weighing device 140 will determine the weight of material 32 on the conveyor belt 41.

In another example, FIGS. 17A-B show a weighing device 140 engaged with the conveyor 40 below the portion 108 of the conveyor belt 41 that extends over the stinger 100, such as in-line with the rollers 43. In this embodiment, the weight of the material (not shown) will be determined as it passes over the belt portion 108. It should be noted that the exact position of the material 32 on the conveyor belt portion 108 over the stinger 100 when the weighing device 140 (of any embodiment) takes a weight measurement may vary and is not limiting upon the present disclosure or appended claims. All references above (and in the appended claims) to that position or time should be construed to mean at some time after the material 32 passes on the belt portion 108. It should also be noted that multiple different weighing devices 140 are shown in the Figures for illustrative purposes. While the material discharge metering system 92 may include multiple weighing devices 140, only one weighing device 140 (which may, for example, include one or more strain gage load cells 144) will be sufficient in many applications.

Referring back to FIGS. 14A-C, the system 92 may include any suitable component(s) to determine the Actual Discharge Rate. In some embodiments, such as shown in FIG. 14B, an integrator 160 may be provided to receive output from the weighing device 140 and encoder 134, determine the Actual Discharge Rate and provide it to the controller 124. In other embodiments, the integrator 160 may, for example, receive weight data from the weighing device 140 and speed data from the controller 124 or another source. If included, the integrator 160 may have any suitable form, configuration and operation. For example, the integrator 160 may be a transceiver that has two-way communication with the controller 124, or a transmitter having one-way communication with the controller 124. One example of a presently commercially available integrator 160 is the Deep Universal sold by Rice Lake Weighing Systems under model number 1938837.

If desired, the material discharge metering system 92 may be fully automated to operate on a continuing, real-time basis, according to a pre-programmed time-sequence (e.g. every x minutes) or upon request. In the fully automated, continuing, real-time configuration, the system 92 will effectively meter the amount and rate of material 32 discharged off the discharge end 106 of the conveyor belt 41 as the Actual Rate of Discharge is calculated.

An example operation of the embodiment shown in FIGS. 14A-C and 16A-D in conjunction with a discharge control device 10 (e.g. FIGS. 2-12) or other method (e.g. FIG. 13) of preventing at least substantial spillage of material 32 off the conveyor 40 will now be described with reference to FIG. 19. The exemplary material discharge metering system 92 includes a weighing device 140 and encoder 134, which take (at least substantially) simultaneous weight and pulley speed measurements respectively, such as described above. The exemplary integrator 160 receives the measurements taken by the weighing device 140 and encoder 134 (steps 162, 164) and calculates the Actual Discharge Rate. The Actual Discharge Rate can be calculated in any desired units, such as pounds per minute (PPM) or tons per hour (TPH). In step 166, the integrator 160 provides the Actual Discharge Rate to the controller 124.

Based at least partially upon the Actual Discharge Rate, the exemplary controller 124 commands the motor actuator 126 (step 168) to increase, decrease or maintain the speed of the motor 114 (step 170), which changes or maintains the speed of the drive pulley 110 (step 172), respectively. A change in the speed of the drive pulley 110 will change the speed of the conveyor belt 41 and Actual Discharge Rate. In this example, the controller 124 compares the Actual Discharge rate to a desired discharge rate (e.g. blender demand) input into the controller 124. However, the controller 124 may consider other or different variables, as desired, in determining whether or when to change the speed of the motor 114. If desired, the exemplary system 92 can be configured so that the above process is repeated on an automated, ongoing, real-time basis, which may effectively throttle the motor actuator 126 and motor 114 to cause controlled metering of material 32 off the conveyor 40. This may result in a steady volume of material 32 dispensed onto and delivered by the conveyor belt 41, providing substantially constant compression on the weighing device 140 and, consequently, optimizing its effectiveness.

Now referring to FIG. 20, in embodiments in which the motor 114 is an electric motor and the motor actuator 126 is a VFD, an encoder may not be included. In this example, the weighing device 140 and the VFD may take (at least substantially) simultaneous weight and speed (conveyor belt and/or pulley) measurements, respectively. In step 162, the exemplary weighing device 140 provides weight data to the integrator 160. The illustrated VFD provides conveyor belt and/or pulley speed measurements to the controller 124 (step 165), which, in turn, provides it to the integrator 160 (step 164). The illustrated integrator 160 calculates the Actual Discharge Rate in any desired units, such as pounds per minute (PPM) or tons per hour (TPH). In step 166, the integrator 160 provides the Actual Discharge Rate to the controller 124. The remainder of the description above with respect to FIG. 19 applies similarly to this embodiment. For example, in step 168, based at least partially upon the Actual Discharge Rate, the exemplary controller 124 commands the motor actuator (VFD) 126 to increase, decrease or maintain the speed of the motor 114 (step 170). Likewise, if desired, the exemplary system 92 can be configured so that the above process is repeated on an automated, ongoing, real-time basis, which may effectively throttle the motor actuator 126 and motor 114 to cause controlled metering of material 32 off the conveyor 40.

Referring back to FIG. 14A, in another independent aspect of the present disclosure, the controller 124 may be configured to control the output of material 32 from the material dispenser 30 onto the conveyor 40. For example, when the material dispenser 30 includes multiple material storage compartments 37 and individual gates 38 (e.g. FIG. 7) associated with each dispenser opening 34, the controller 124 may be configured to control operation of the gates 38 between open, closed (and possibly also intermediate) positions to control which compartment(s) 37 provide material 32 onto the conveyor 40 and/or the rate of supply of material 32.

The illustrated controller 124 may control operation of the gates 34 based upon any suitable criteria. For example, one or more sensors 176 may be associated with each material storage compartment 37, configured to determine when the associated compartment 37 is empty and communicate with the controller 124. The sensor 176 may have any suitable form, configuration and operation. An example presently commercially available sensor 176 is the Capacitive Sensor sold by Turk under model number BCC10-S30-AP4X-H1141. Upon or after receiving a compartment empty signal from a sensor 176, the exemplary controller 124 is configured to close all gates 34 associated with the empty compartment 37, open all gates 34 associated with one or more other compartment 37, take other action or a combination thereof. For example, if the material dispenser 30 includes three compartments 37 each having two dispenser openings 34 (and associated gates 38), and a fourth compartment 37 having three dispenser openings 34 (and associated gates 38), the illustrated controller 124 is capable of generally concurrently opening and closing all gates 38 associated with each compartment 37. In such instance, the gates 38 are not opened or closed on an individual basis, but on a compartment-by-compartment basis. However, there may be instances where the controller 124 opens and closes the gates 38 on a gate-by-gate basis.

The controller 124 may use other criteria to control the output of material 32 from the material dispenser 30 to the conveyor 40, such as according to a pre-programmed open/close sequence, based upon the type of material 32 in each compartment 37, the proximity of the compartments 37 to the stinger 100, the size or storage capacity of the compartments 37, the amount of material desired to be supplied from a particular compartment 37, the desired material discharge rate, other criteria or a combination thereof.

If desired, the material discharge metering system 92 may be configured to control the output of material 32, such as described above, through the dispenser openings 34 of multiple material dispensers 30 (not shown) all arranged to dispense material 32 onto the conveyor 40. In the embodiment of FIG. 21, for example, the system 92 may be used with any number N of material dispensers 30, such as, for example, 3-6 mobile sand conveying or storage units 36.

The components of the system 92 may be configured to communicate wirelessly, via hard-wiring, such as with cables, or a combination thereof. For example, the controller 124 for each material dispenser 30 may communicate with other component(s) (e.g. the associated actuator(s) 126, integrator(s) 160, sensors 176, other controllers 124, etc.) wirelessly, via cable or other hard-wiring or a combination thereof In yet another independent aspect of the present disclosure, the material discharge metering system 92 may be remotely controlled or monitored. In FIG. 21, for example, the system 92 may be remotely controlled or monitored by one or more operator (not shown) with a remote control 180. The remote control 180 may have any suitable form, configuration, features and operation and communicate with other components of the system 92 in any suitable manner. In this embodiment, the remote control 180 communicates wirelessly via Wi-Fi with the electronic controller 124 (e.g. FIG. 14A) of one or multiple material dispensers 30 configured to dispense material 32 onto the conveyor 40. Thus, the operator (not shown) can be off-site, or distanced from the material dispenser(s) 30 and conveyor 40, during operations.

The illustrated remote control 180 includes a display 184, belt speed adjustment knob 188, manual/auto switch 192 and multiple gate open switches 196. In this example, the display 184 can be used to view any desired information from or provided to the remote control 180. Some examples of information may include the desired discharge rate, compartment 37 open/close sequence and information provided by each controller 124, such as empty compartment data 37, Actual Discharge Rate and individual dispenser identifying information (e.g. address, control information, etc).

The exemplary manual/auto switch 192 allows the operator to select between automatic operation of the material discharge metering system 92, such as described above, and manual override. In the manual override mode, the illustrated remote control 180 allows the operator to adjust the speed of the conveyor belt 41 (e.g. FIG. 14A) by turning the belt speed adjustment knob 188. Manual control with the illustrated remote control 180 also allows the operator to open and close all respective gates 38 corresponding with each material storage compartments 37 of each material dispenser(s) 30 with the switches 196. In this example, each gate open switch 196 corresponds with one of the four material storage compartments 37 of a typical mobile sand conveying or storage unit 36 (e.g. FIG. 14A). Flipping a switch 196 will open or close all gates 38 of a particular compartment (of a selected material dispenser 30). The exemplary system 92 allows automatic or manual remote control of gate open, closed and partial-open positions, compartment 37 open/close sequence and conveyor belt 41 speed and may be used to isolate individual material dispensers 30 or groups of dispensers 30, or other functions, all without personnel at the equipment location.

Figure 22:
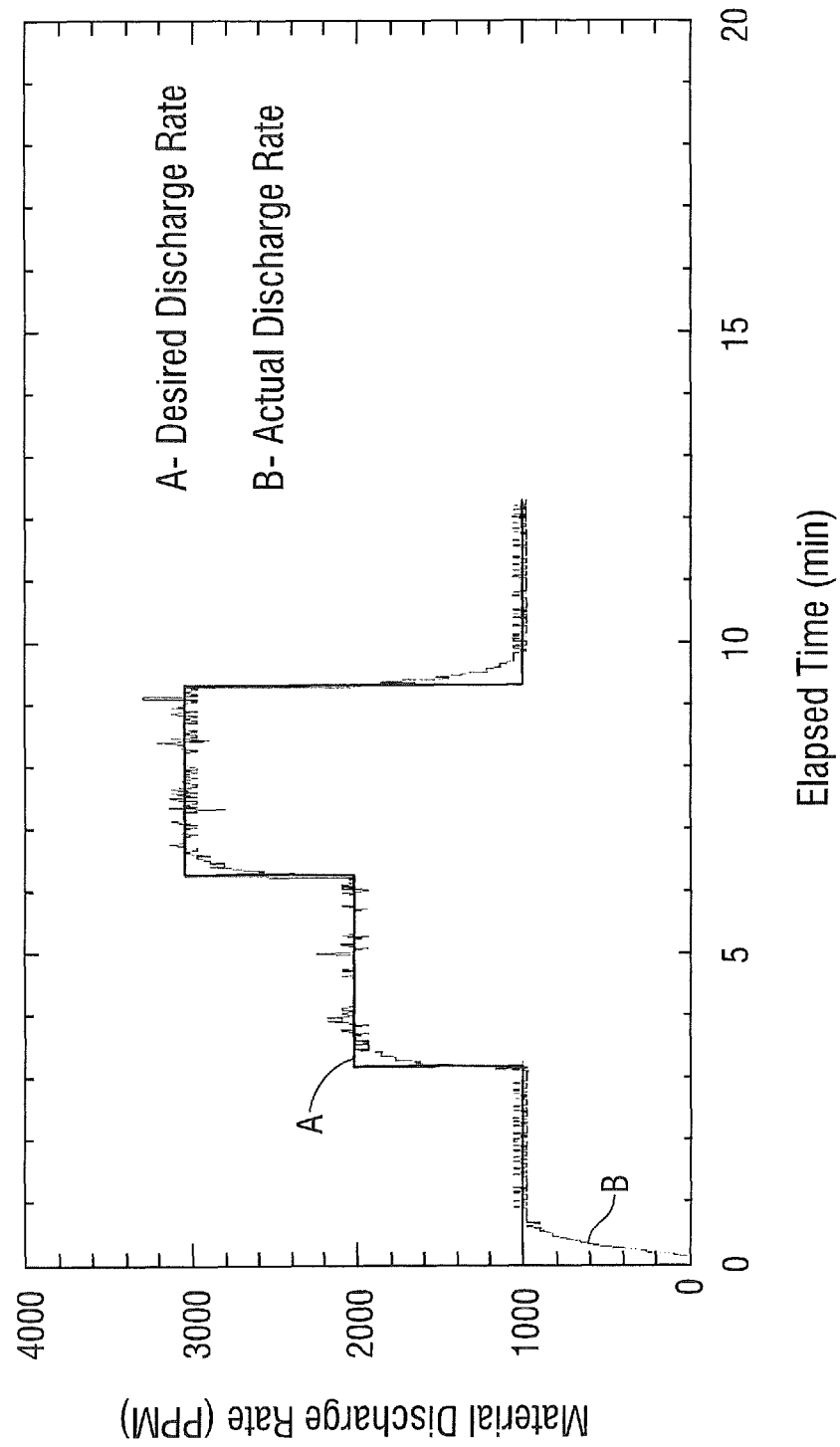
FIG. 22 is a graph showing the results from an example experiment using a material discharge metering system in accordance with an embodiment of the present disclosure.

FIG. 22 illustrates test results from an experiment conducted with an exemplary material discharge metering system 92 used with a material dispenser 30 (mobile sand conveying or storage unit 36), such as the embodiment of FIG. 14A. The material 32 dispensed onto the conveyor 40 from the material dispenser 30 was "5030 White Sand" and the electronic controller 124 was a proportional-integral-derivative (PID) controller. The motor 114 was a hydraulic motor 116 and the motor actuator 126 (e.g. FIG. 14B) was a hydraulic control valve 128. An exemplary weighing device 140

(dual-unit load cells 144), was engaged with the conveyor 40 below the portion 108 of the conveyor belt 41 extending over the stinger 100. An exemplary encoder 134 (e.g. FIG. 16B) was connected to the drive pulley 110. An integrator 160 received real-time, continuing, measurements from the weighing device 140 and encoder 134, calculated the Actual Rate of Discharge based thereupon and transmitted the same to the controller 124 on a continuing basis. The controller 124 compared the Actual Rate of Discharge to a desired rate of discharge (blender demand) provided to the controller 124 and adjusted the speed of the conveyor belt 41 by varying the flow of hydraulic fluid from the valve 128 to the motor 114 to produce the illustrated results. As shown, the Actual Rate of Discharge "B" was adjusted to closely match the desired discharge rate, or demand "A".

Figure 23:
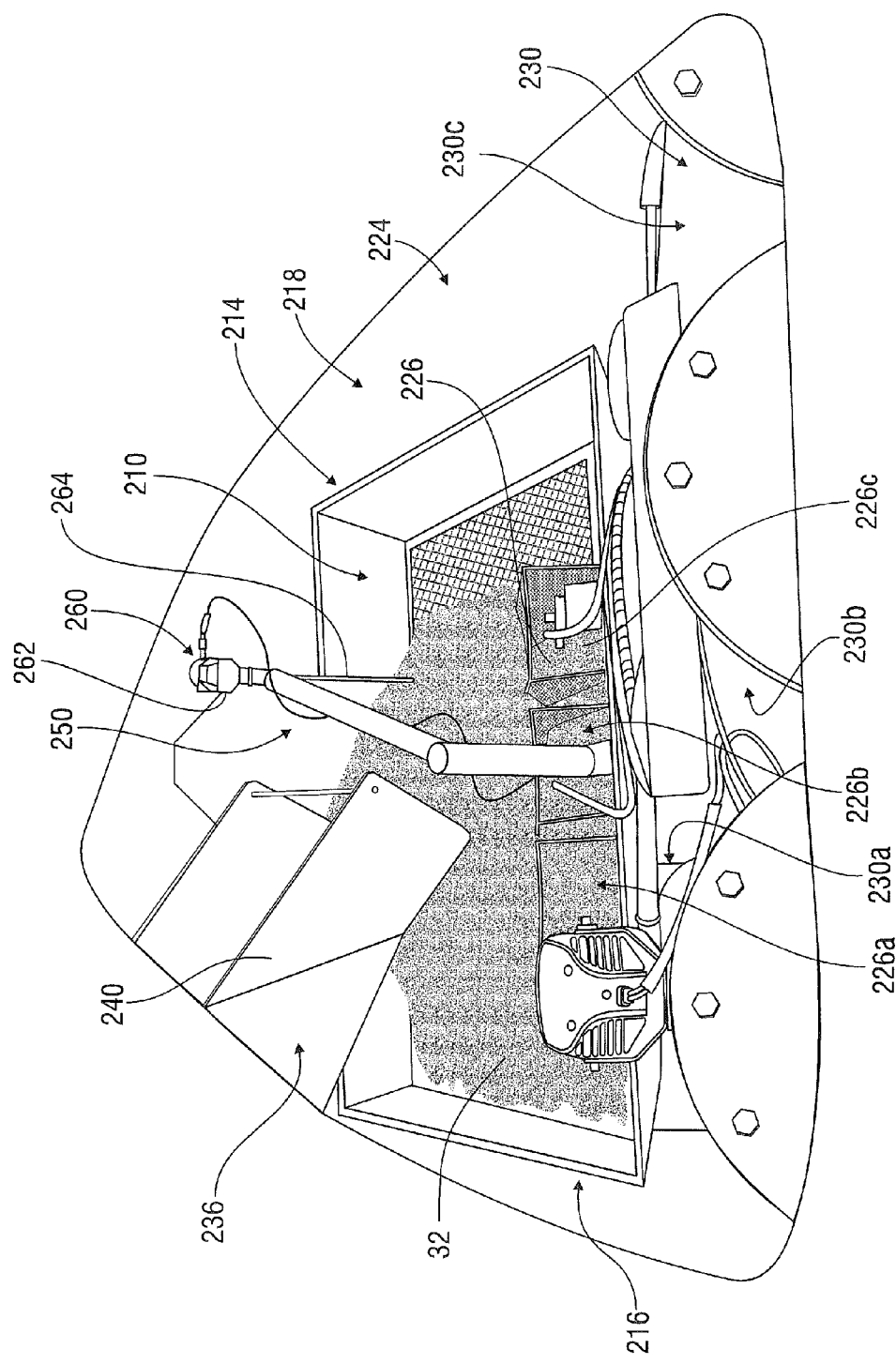
FIG. 23 is a partial top view of an exemplary hopper assembly bin of a blender unit shown being at least partially filled with material and including an embodiment of a material height measurement system in accordance with the present disclosure.

Referring now to FIG. 23, in another independent aspect of the present disclosure, the height, or level, of material 32 delivered into the bin 210 of a hopper assembly 214 may be estimated or determined. The hopper assembly 214 may have any suitable form, configuration and operation. In the illustrated example, the hopper assembly 214 is part of a blender unit 224 that receives the material from the material dispenser 30 (see e.g. FIG. 14A). The exemplary blender unit 224 is useful for mixing the material 32, such as sand or proppant, with one or more liquid and/or chemical and feeding the mixture to one or more fracturing fluid pumping units (not shown), which delivers the mixture into an underground well (not shown). One example of a blender unit currently used by the assignee of this patent, Baker Hughes Incorporated, is its trailer-mounted blender unit model number 125E. A currently commercially available trailer-mounted blender unit is the HST 360 by Jerell. An example of a fracturing fluid pumping unit currently used by the assignee of this patent, Baker Hughes Incorporated, is the Baker Hughes Rhino pump unit.

Figure 25:
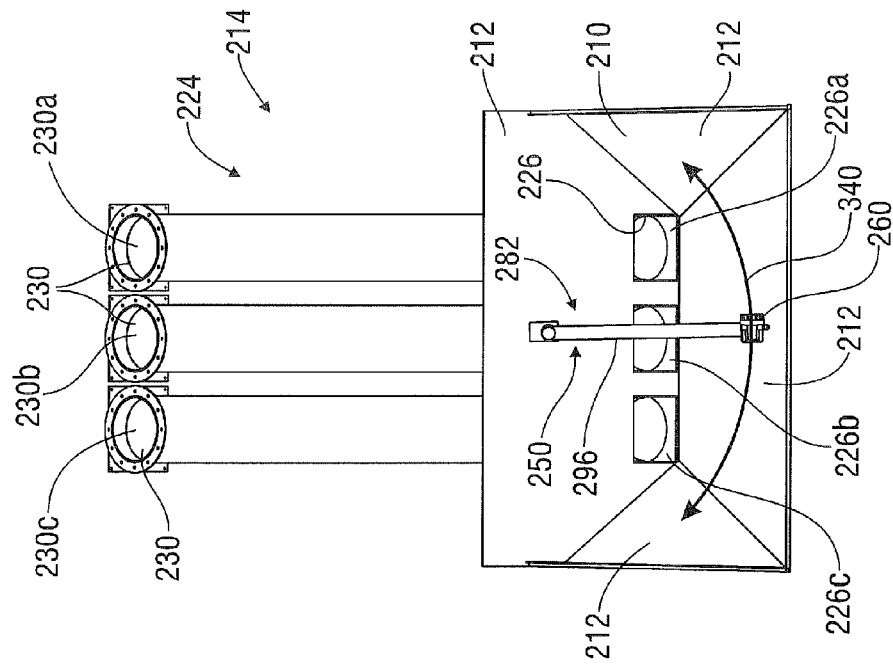
FIG. 25 is a top view of the material height measurement system and hopper assembly shown in FIG. 24.
Figure 24:
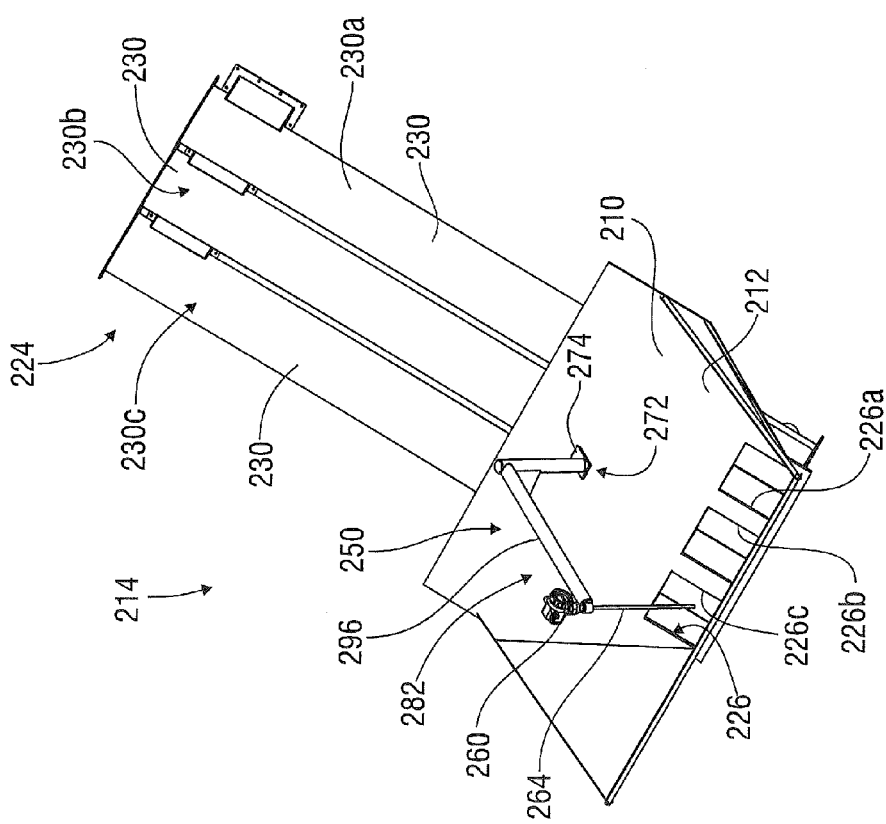
FIG. 24 is an isolated perspective view of the material height measurement system shown in FIG. 23 and portions of the associated exemplary hopper assembly.

In this example, as shown in FIGS. 24 & 25, the bin 210 of the hopper assembly 214 includes at least one flow outlet 226 aligned with a passageway (sometimes referred to as a "screw") 230 of the blender unit 224. Material 32 (FIG. 23) in the exemplary bin 210 is sucked, or drawn, upwardly from one of more flow outlet 226 through one or more of the screws 230 into a mixing tub (not shown) of the blender unit 224. The illustrated bin 210 includes three flow outlets 226a-c which are associated with three passageways 230a-c. Other embodiments may include two, or more than three, flow outlets 226. Additional details about the form, configuration and operation of the illustrated and other types of hopper assemblies and blender units are known in the art and may be found in publicly available documents. However, the present disclosure is not limited by any of above or other details about the type, form, configuration and operation of the hopper assembly and blender unit (when included). Accordingly, the present disclosure may be used with any type of hopper assembly and in any desired application and industry.

Referring back to FIG. 23, in this example, material 32 is fed into the bin 210 from a mobile dual-belt device 236, which receives the material 32 from the material dispenser 30 (see e.g. FIG. 14A). The mobile dual-belt device 236, when used, may have any suitable form, configuration and operation, and is in no way limiting upon the present disclosure. For example, the dual-belt device 236 may be mounted on a trailer parked, or positionable, among various locations and orientations relative to the hopper assembly 214 to provide material 32 into the bin 210. In this embodiment, the dual-belt device 236 is positioned along a first side 216 of the hopper assembly 214, and delivers the material 32 into the bin 210 through a delivery chute 240 shown positioned over the bin 210. Additional details about the form, configuration and operation of the illustrated and other types of mobile dual-belt device are known in the art and may be found in publicly available documents. However, the present disclosure is not limited by any of above or other details about the form, configuration and operation of the mobile dual-belt device. Further, the present disclosure is not limited to use with a mobile dual-belt device, but may be used with any suitable desirable equipment. In a typical hydraulic fracturing job, the delivery of material from the material dispenser 30 (e.g. FIG. 14A) to the dual-belt device 236 to the blender unit 224 to the fracturing fluid pumping units (not shown) occurs on an ongoing basis over one or more time period.

It may be necessary or desirable to estimate the height, or level, of material 32 delivered into the bin 210 for any suitable reason. For example, this information may be useful to optimize material delivery operations. In the present embodiment, this information may be used to adjust the Actual Discharge Rate from the material dispenser 30 (see e.g. FIG. 14A) to improve or optimize the efficiency and/or operation of the blender unit 224 (which may supply material to multiple (e.g. twenty) different fracturing fluid pumping units (not shown)).

Now in accordance with an embodiment of the present disclosure, still referring to FIG. 23, a material height measurement system 250 is shown associated with the illustrated hopper assembly 214. The system 250 is useful to measure or estimate the height of material in the bin 210 during operations (as the material 32 is simultaneously delivered into and removed from the bin 210). The exemplary material height measurement system 250 carries at least one probe assembly 260. The illustrated probe assembly 260 includes a measuring rod 264 positioned to extend into the bin 210 and measure the height of material 32 therein. Any suitable probe assembly 260 capable of measuring the level of material inside a container may be used. One example presently commercially available probe assembly is the radar-guided Leveflex M FMP 40 family of rod probe assemblies sold by Endress+ Houser. However, the present disclosure is not limited to any particular type of probe assembly, or by the form, configuration and operation thereof In some applications, to obtain an optimal or ideal height measurement of the material 32 in the bin 210, the position or location of the measuring rod 264 of the probe assembly 260 in the bin 210 may vary from job to job, or sometimes even during the same material delivery operation. For example, when a dual-belt device 236 (or other material delivery equipment) is used, the ideal position of the measuring rod 264 may be over the flow outlet 226 of the bin 210 that is farthest from the dual-belt chute 240. In the illustrated embodiment, the end the delivery chute 240 of the dual-belt device 236 is shown positioned over the first and/or second flow outlets 226a, 226b of the bin 210. A mound of material 32 can be seen forming under the end the delivery chute 240. Thus, in this example, the desired position of the measuring rod 264 for measuring the height of the material 32 may be approximately over the third flow outlet 226c, as shown.

However, in other jobs, that location of the measuring rod 264 may not be the ideal position. For example, the ideal position of the measuring rod 264 may depend upon the location of the dual-belt device 236 (or other material delivery equipment) and its chute 240. As mentioned above, the illustrated dual-belt device 236 is positionable at different locations relative to the blender unit 224 (e.g. farther away or closer to the blender unit 224 and/or along another side 218 of the hopper assembly 214). Since the position of the illustrated delivery chute 240 over the bin 210 may vary depending upon how the equipment is parked and/or positioned, it may be necessary or desirable to be able to take material height measurements at different locations in the bin 210. Thus, the illustrated material height measurement system 250 is configured to selectively reposition the measuring rod 264 in any among multiple locations within the bin 210 so that the probe assembly 260 can measure the height of material 32 in the bin 210 at different locations.

The measuring rod 264 may be selectively positioned in the bin 210 at any desired time, such as when the delivery chute 240 is positioned over the bin 210. In such instance, the position of the measuring rod 264 may be selected, for example, based upon where the delivery chute 240 lines up over the bin 210. In some applications, such as when the blender unit 224 and dual-belt device 236 are not moved after initial positioning for a job, the measuring rod 264 may be moved into position only once at the beginning of the job. In other embodiments, there may be a need or desire to move the measuring rod 264 at additional times during the same job.

The material height measurement system 250 may have any suitable form, components, configuration and operation. In this embodiment, now referring to FIGS. 26 and 27, the material height measurement system 250 includes an upwardly-extending, elongated base 268 (FIG. 27) and a probe carrier 282 associated therewith and being selectively movable relative thereto. The base 268 and probe carrier 282 may have any suitable form, configuration and operation. In this example, the elongated base 268 is a hollow tubular member, such as a pipe. In other embodiments, the base 268 may be solid, partially solid/hollow or have any other desirable construction. The exemplary base 268 is coupled to the hopper assembly 214 (e.g. FIG. 24) in a manner that allows it to be non-movable relative to the bin 210. For example, a plate 274 at the lower end 272 of the base 268 may be welded or bolted to the bin 210 (e.g. FIG. 24). However, in other embodiments, the base 268 may be selectively moveable relative to the bin 210.

Figure 26:
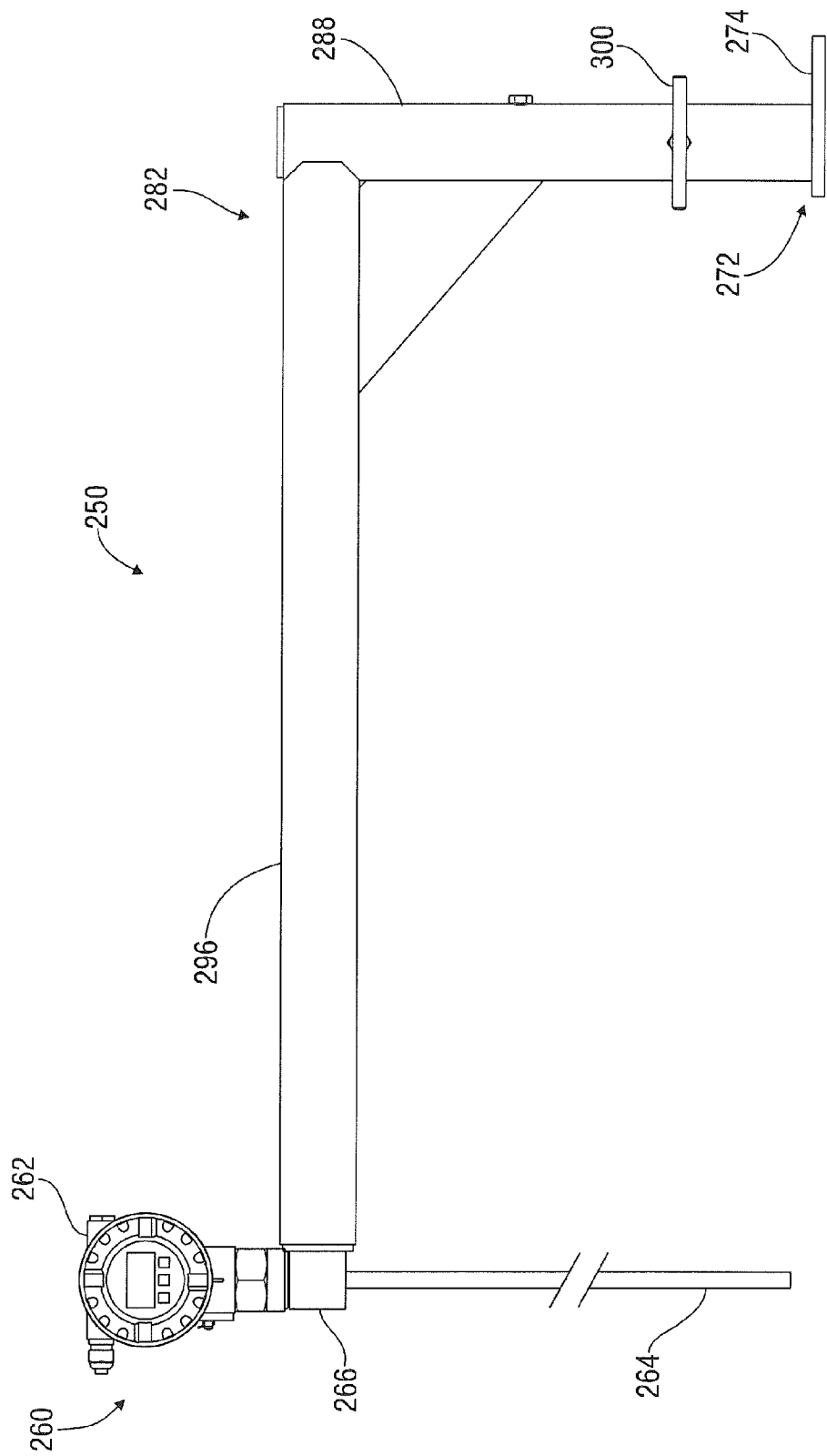
FIG. 26 is a side view of the material height measurement system shown in FIG. 23.

Still referring to FIGS. 26 and 27, the exemplary probe carrier 282 includes an elongated body 288 and an elongated arm 296 extending laterally outwardly therefrom. In this embodiment, the body 288 and arm 296 form an approximate ninety degree angle in a generally L-shaped configuration. However, the body 288 and arm 296 may be arranged in different configurations in other embodiments. Thus, the present disclosure is not limited by the positional relationship of the body 288 and arm 296 relative to one another.

The exemplary elongated arm 296 is configured be positionable over the bin 210 (FIG. 24) and carry one or more probe assemblies 260 so that the measuring rod(s) 264 thereof extends downwardly into the bin 210. The probe assembly 260 may be coupled to the elongated arm 296 in any suitable manner. For example, the probe assembly 260 may seat in, or screw into, a collar 266 at the end (or another location) of the elongated arm 296. In this embodiment, the collar 266 is a threaded 2" collar.

Still referring to FIGS. 26 and 27, the probe carrier 282 may be associated with the elongated base 268 in any suitable manner, as long as the arm 296 is moveable relative to the bin 210 (e.g. FIG. 24). For example, the body 288 of the probe carrier 282 may be slideably engaged with the elongated base 268 so that it is rotatable relative thereto. In such instance, as the elongated body 288 rotates relative to the base 268, the elongated arm 296 effectively pivots relative to the base 268 and moves sideways (laterally) over the bin 210, repositioning the measuring rod 264 relative to the bin 210. In the present embodiment, referring specifically to FIG. 27, at least a lower portion 290 of the body 288 is tubular (having a bore 292) and slides over at least the upper end 270 of the elongated base 268. Thus, when the illustrated body 288 is disposed over the base 268, it is rotatable relative thereto. However, in other embodiments, the elongated body 228 may instead be insertable into the base 268 and similarly rotatable relative thereto. Thus, the illustrated measuring rod 264 may be selectively positionable in the bin 210 (e.g. FIG. 24) by manually moving the arm 296 sideways (laterally) over the bin 210. In other embodiments, this process may be automated, as is and becomes further known.

Referring now to FIGS. 27 and 28, the desired position of the probe carrier 282 relative to the base 268 may be secured in any suitable manner. For example, a lock 300 may be used to secure the position of the elongated body 288 of the probe carrier 282 relative to the base 268. The lock 300 may have any suitable form, configuration and operation. For example, the lock 300 may be coupled to the elongated body 288 and selectively releaseably engageable with the base 268. In such instance, the lock 300 may be selectively moveable between at least one open position and at least one closed position. The open position(s) of the exemplary lock 300 allows rotational movement of the elongated body 288 relative to the base 268, while the closed position(s) disallows such relative movement.

In this embodiment, the lock 300 includes a rotatable bolt 304 having first and second ends 308, 310. A rotatable handle 312 is disposed at the first end 308 of the illustrated bolt 304, which extends through an orifice 314 formed in the elongated body 288. When the exemplary elongated body 288 is disposed over the base 268, sufficient rotation of the exemplary handle 312 (and thus the bolt 304) in one direction (e.g. clockwise) will cause the second end 310 of the bolt 304 to engage or grip the base 268, securing the position of the elongated body 288 relative to the base 268. This represents the closed position of the illustrated lock 300, preventing relative movement of the probe carrier 282 relative to the base 268.

Now referring back to FIGS. 24 and 25, if desired, the range of movement of the arm 296 of the probe carrier 282 relative to the bin 210 may be limited. In some applications, this may be useful to prevent the probe carrier 282 and/or the probe assembly 260 or its measuring rod 64 from hitting one or more walls 212 of the bin 210. For example, as shown in FIGS. 27 and 28, the material height measurement system 250 may have one or more restrictors 320 that limit, or define, the range of movement of the probe carrier 282 relative to the base 268. When included, the restrictor(s) 320 may have any suitable form, configuration and operation. In this embodiment, the restrictor 320 include a pin 324 extending through a hole 328 in the lower portion 290 of the elongated body 288, and a cut-out 332 formed in the exemplary base 268 at, or proximate to, its upper end 270. Side walls 336 formed in the illustrated base 268 define the sides of the cut-out 332. When the elongated body 288 and base 268 are slideably engaged, the illustrated pin 324 is laterally moveable within the cut-out 332 between the side walls 336. The side walls 336 thus limit the sideways, or lateral, movement of the pin 324 in the cut-out 332, and the movement of the probe carrier 282 relative to the base 268 and the measuring rod 264 in the bin 210 (FIG. 24). In this example, as shown in FIG. 25, the range of sideways movement of the probe carrier 282 relative to the bin 210 is along the arc 340. If desired, the restrictor 320 may be configured so the pin 324 rests on the ledge 338 (FIGS. 27 and 28) that defines the bottom of the cut-out 332, such as to assist in guiding the movement of the probe carrier 282, for safety reasons, and/or any other desired purpose.

It should be noted, in other embodiments, the measuring rod 264 may be moveable along additional or different paths.

For example, the length of the elongated arm 296 of the probe carrier 282 may be adjustable. In some embodiments, the elongated arm 296 may include multiple interconnected telescoping sections (not shown) to allow adjustability of the length of the arm 296. In such instance, the measuring rod 264 may be moveable along multiple different paths, each at a different distance from the base 268.

Figure 30:
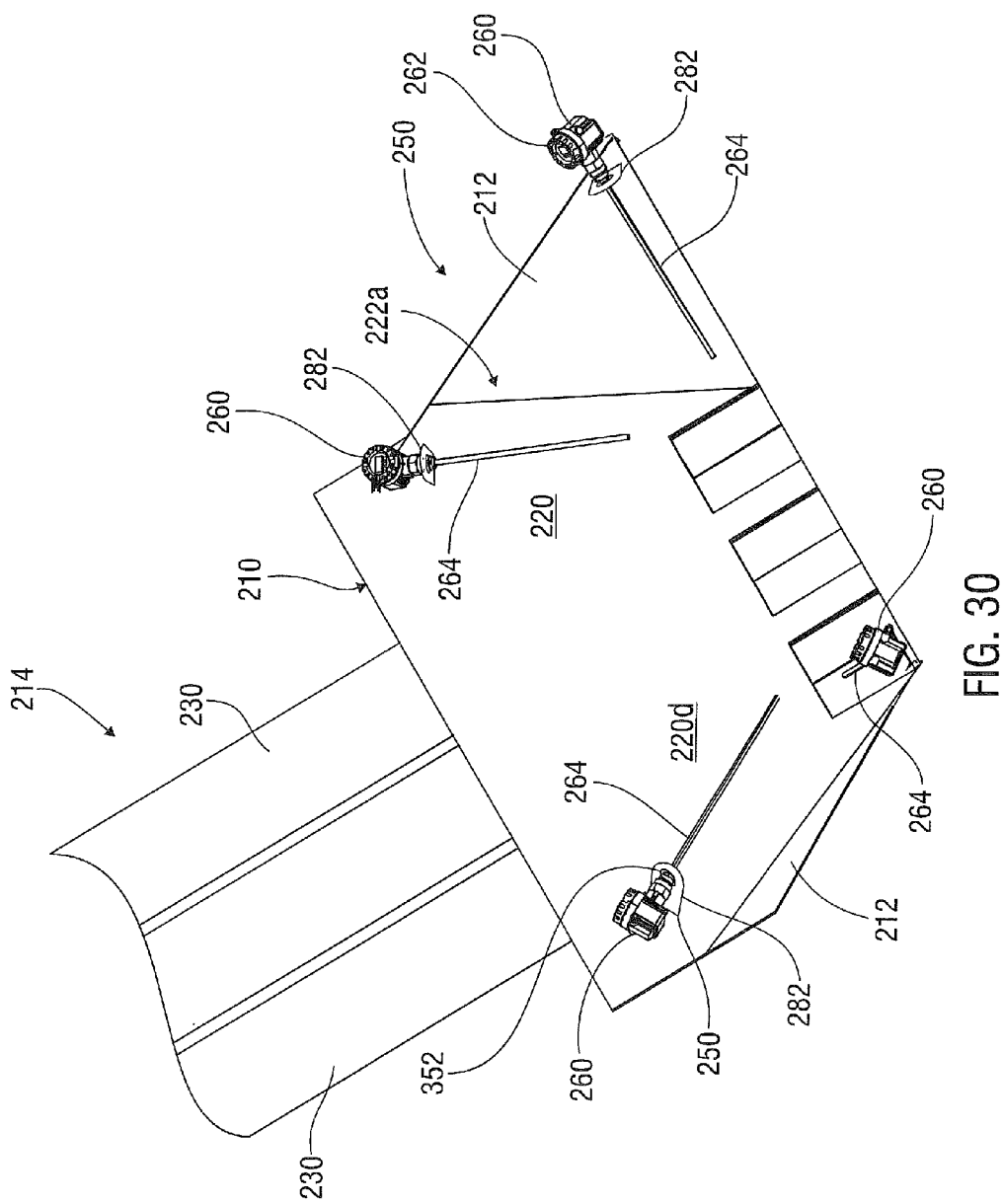
FIG. 30 is a perspective view of the material height measurement system shown in FIG. 29.

Now referring to FIGS. 29-30, in other embodiments, the material height measurement system 250 may include four probe carriers 282 disposed proximate to different regions 220 of the bin 210. Each illustrated probe carrier 282 holds at least one probe assembly 260 so that the height or level of material 32 (e.g. FIG. 23) delivered into the bin 210 may be estimated or determined at up to four different locations in the bin 210. In this embodiment, a first probe carrier 282a is coupled to the hopper assembly 214 proximate to a first region 220a of the bin 210. The exemplary first probe carrier 282a holds its associated probe assembly 260 in a fixed position relative to the bin 210 so that the measuring rod 264 thereof is disposed at a desired location in the first region 220a and may measure the height of material (not shown) at that location. The same is true for the second, third and fourth probe carriers 282b, 282c and 282d with respected to regions 220b, 220c and 220d, respectively.

The probe carriers 282 of these embodiments may have any suitable form, configuration and operation. For example, the probe carriers 282a-d may be brackets 350 welded, bolted or otherwise secured to the bin 210 and having at least one receiver 352 for engaging and holding the associated probe assembly 260. In other embodiments, each probe carrier 282 may instead be a bolt, or multiple bolts (not shown) engageable with the associated probe assembly 260 and a wall 212 of the bin 210.

If desired, one or more of the probe assemblies 260 may be selectively removable from its associated carrier 282, such as for maintenance, repair, replacement, when material height measurements are not necessary at the corresponding region 220 of the bin 210 or other reasons. In some embodiments, the position of any one or more of the probe carriers 282a-d may be adjustable, or the position of the associated probe assembly 260 in the probe carrier 282a-d may be adjustable, such as to adjust the precise location of the corresponding measuring rod 264 in the bin 210.

In the present embodiment, the bin 210 includes numerous walls 212 that form four intersections, or corners, 222. Each region 220a-d of the bin 210 generally represents a different quarter-section (quadrant) of the bin 210 proximate to one of the respective corners 222a-d. Each illustrated probe carrier 282a-d is coupled to one of the walls 212 of the bin 210 proximate to the corresponding respective corner 222a-d. Thus, when all four probe assemblies 260 are provided, the level of material (not shown) can be measured in each quadrant 220a-d regardless of where the material 32 is dispensed into the bin 210. If desired, simultaneous measurements from all four probe assemblies 260 can be interpolated to make other determinations, such as where the material (not shown) is mounding in the bin 210.

Referring back to FIG. 23, if desired, the transmitter 262 of the one or more probe assemblies 260 may be configured to communicate material height measurements to the electronic controller 124 (e.g. FIG. 14B) of the material discharge metering system 92 on the material dispenser 30, either directly or through one or more other device. For example, the transmitter 262 may transmit data to an electronic controller 232 (FIG. 31), or other component, on the blender unit 224. When included, the controller 232 may have any suitable form, configuration and operation. For example, the controller 232 may be a programmable logic controller (PLC), as is and become known. The above-mentioned components may be configured to communicate by wireless connection, cable or any other suitable manner.

Figure 31:
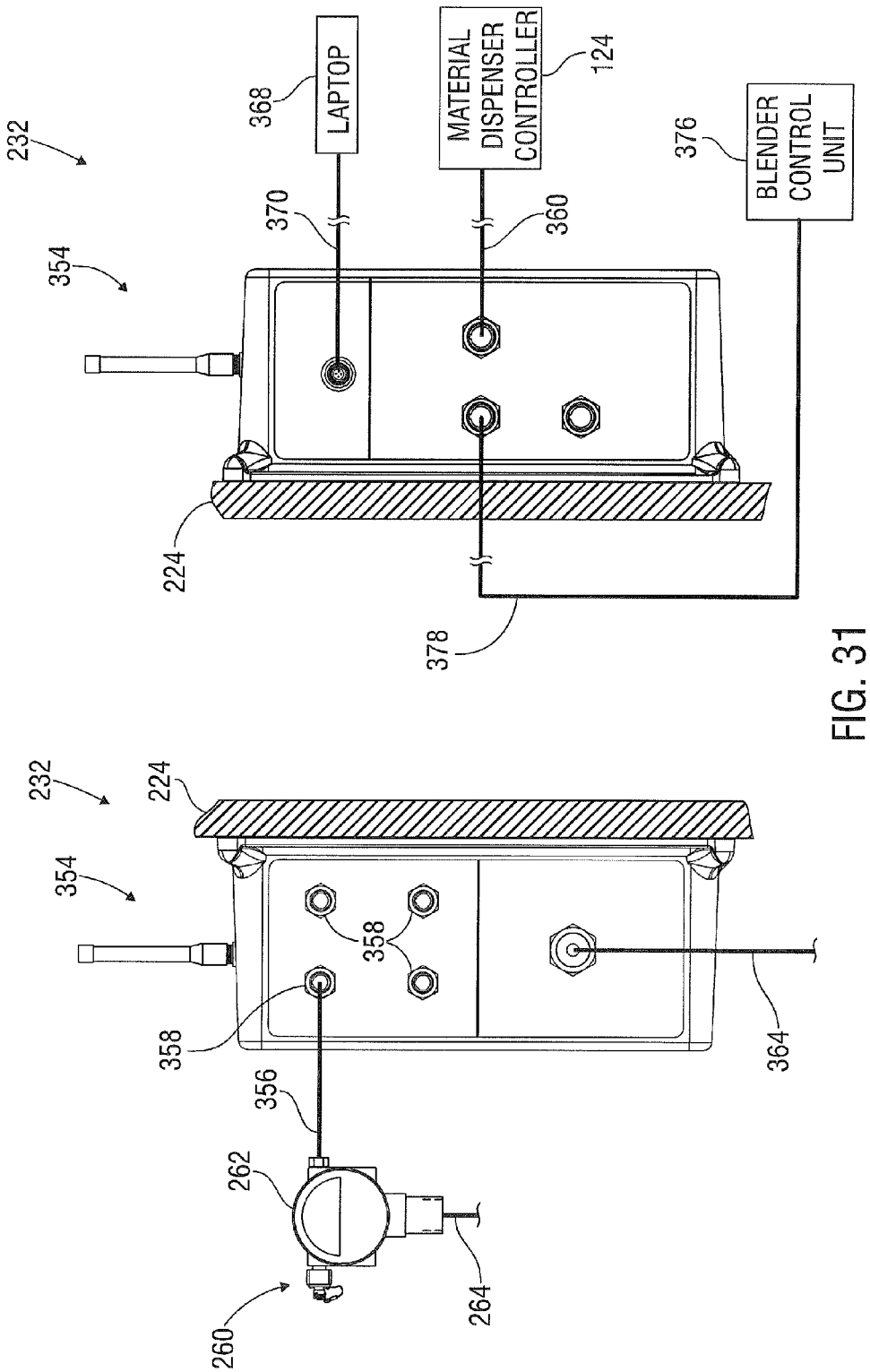
FIG. 31 includes side views of an embodiment of an electronic controller useful in connection with one or more embodiment of a material height measurement system of the present disclosure.

In the present embodiment, as shown in FIG. 31, the controller 232 is an access point (AP) radio kit 354 mounted on the blender unit 224. The transmitter 262 of the one or more exemplary probe assemblies 260 thus communicates material height measurements to the AP radio kit 354. For example, each transmitter 262 may be connected to the kit 354 by a cable 356 connected to an input port 354 on the radio kit 354, by wireless communication or other method. The AP radio kit 354 may also receive data from other sources, such as a blender control unit 376 (also mounted on the blender unit 224). This communication may likewise be made via cable 378, wireless connection or any other desired manner. In this embodiment, the blender control unit 376 provides the blender demand data to the AP radio lit 354. The blender demand is the pre-determined estimated volume or rate of material desired to be provided to the blender unit 376 for the particular hydraulic fracturing operation.

The exemplary AP radio kit 354 communicates the material height measurements and blender demand to the controller 124 on the material dispenser 30 (e.g. FIG. 14B), such as by cable 360, wireless or other connection. If desired, the AP radio kit 354 may also communicate data to any other desired destination, such as a stand-alone computer 368 by cable 370, wireless connection, or other desired manner. However, it should be understood that the AP radio kit 354 may not be included in other embodiments of the present disclosure and is, therefore, not limiting upon the present disclosure.

As described above (with respect to FIGS. 14A-C), in accordance with various embodiments of the present disclosure, the electronic controller 124 (FIG. 14B) may be configured to compare the actual rate of discharge (or amount) of material 32 off the discharge end 106 of the conveyor belt 41 ("Actual Discharge Rate") to a desired delivery rate (e.g. the blender demand), and adjust one or more variable (e.g. the speed of the conveyor belt 41) to match the Actual Discharge Rate to the desired delivery rate when there is a difference. For example, fast-change proportional-integral-derivative (PID) software may be used.

However, even when the controller 124 matches the Actual Discharge Rate to the blender demand, the amount of material 32 that makes it into the bin 210 of the hopper assembly 214 (FIG. 23) from the material dispenser 30 (FIG. 14A) may not match the blender demand. This may be caused by any number of variables depending upon the circumstances, such as measurement errors, disturbances, dynamics of the process and equipment, or a combination thereof. Undesirable consequences may occur. For example, all of the flow outlets 226 in the bin 210 may not be covered with material 32, leading to inefficient or inaccurate blending and hydraulic fracturing fluid pumping. For another example, material may overflow out of the bin 210, leading to waste and other problems.

To compensate for discrepancies between the amount of material actually received in the bin 210 and the Actual Discharge Rate and/or fine tune the material volume in the bin 210, the exemplary controller 124 compares material height measurements from the one or more probe assemblies 260 to a desired target height level of material in the bin 210. Based upon that comparison, the controller 124 may further vary the Actual Discharge Rate. The desired target height level may vary from application to application or depending upon the particular operation. For example, it may be desirable to maintain the height of the material 32 in the bin 210 (at the location of one or more probe measuring rods 264) at a target level of between 30-60 percent material coverage of the measuring rod 264 (measured from the bottom of the rod 264). In some embodiments, in order to provide an ideal volume of material to the hopper assembly 214 and prevent material 32 from overflowing from the bin 210, the target height level may be 40 percent material coverage of the measuring rod 264.

When the material height readings from the probe assembly 260 fall below the target height level, the illustrated controller 124 will increase the Actual Discharge Rate sufficient to compensate for the discrepancy. Likewise, when the material height readings from the probe assembly 260 are above the target height level, the exemplary controller 124 will sufficiently decrease the Actual Discharge Rate. These changes to the Actual Discharge Rate will typically be small compared to changes made to match the Actual Discharge Rate to the blender demand. For example, a slow proportional-integral-derivative (PID) software may be used for this operation.

The above processes may be repeated on an automated, ongoing, real-time basis to cause controlled metering of material 32 from the material dispenser 30 and attempt to maintain the level of material 32 in the hopper bin 210 at a targeted value. Thus, in this embodiment, the controller 124 implements a dynamic dual-loop control strategy to maintain a targeted, or optimum, level of material 32 in the bin 210 throughout the course of a job.

Preferred embodiments of the present disclosure thus offer advantages over the prior art and are well adapted to carry out one or more of the objects of this disclosure. However, the present invention does not require each of the components and acts described above and is in no way limited to the above-described embodiments or methods of operation. Any one or more of the above components, features and processes may be employed in any suitable configuration without inclusion of other such components, features and processes. Moreover, the present invention includes additional features, capabilities, functions, methods, uses and applications that have not been specifically addressed herein but are, or will become, apparent from the description herein, the appended drawings and claims.

The methods that may be described above or claimed herein and any other methods which may fall within the scope of the appended claims can be performed in any desired suitable order and are not necessarily limited to any sequence described herein or as may be listed in the appended claims. Further, the methods of the present invention do not necessarily require use of the particular embodiments shown and described herein, but are equally applicable with any other suitable structure, form and configuration of components.

While exemplary embodiments of the invention have been shown and described, many variations, modifications and/or changes of the system, apparatus and methods of the present invention, such as in the components, details of construction and operation, arrangement of parts and/or methods of use, are possible, contemplated by the patent applicant(s), within the scope of the appended claims, and may be made and used by one of ordinary skill in the art without departing from the spirit or teachings of the invention and scope of appended claims. Thus, all matter herein set forth or shown in the accompanying drawings should be interpreted as illustrative, and the scope of the disclosure and the appended claims should not be limited to the embodiments described and shown herein.

The invention claimed is:

1. System for estimating or determining the height of material dispensed into the bin of a hopper assembly at any among a plurality of locations within the bin, the system comprising:
   at least one probe assembly having at least one measuring rod useful to measure the height of material in the bin of the hopper assembly;
   an upwardly-extending, elongated base having upper and lower ends, said lower end of said base being coupled to the hopper assembly in a manner that allows said base to be non-moveable relative to the bin; and
   a probe carrier having an elongated body and an elongated arm extending laterally outwardly therefrom and over the bin of the hopper assembly, said elongated arm being configured to carry at least one said probe assembly so that said measuring rod thereof extends downwardly therefrom into the bin, said elongated body having a tubular lower portion slideably engaged with said elongated base and being selectively rotatable relative thereto, wherein rotation of said elongated body causes said elongated arm to pivot relative to said elongated base over the bin and reposition said measuring rod in any among a plurality of positions relative to the bin.

2. The system of claim 1 wherein said tubular lower portion of said elongated body is slideably disposed over said upper end of said elongated base.

3. The system of claim 1 further including a lock associated with said elongated body of said probe carrier and said elongated base and configured to secure the position of said measuring rod relative to the bin, said lock being selectively moveable between at least one open position and at least one closed position, said open position allowing said elongated body to rotate relative to said elongated base and said closed position disallowing rotation of said elongated body relative to said elongated base.

4. The system of claim 3 wherein said lock is coupled to said elongated body and selectively releaseably engageable with said elongated base.

5. The system of claim 4 wherein said lock includes a rotatable bolt having first and second ends and a handle associated with said first end, said bolt extending through an orifice in said elongated body and, when said lock is in said closed position, said second end of said bolt is configured to engage said elongated base and prevent said elongated body from moving relative to said elongated base.

6. The system of claim 1 further including at least one restrictor associated with said elongated body of said probe carrier and said elongated base, said restrictor configured to limit the range of motion of said elongated body relative to said elongated base when said elongated body is slideably engaged with said elongated base, limiting the range of motion of said measuring rod of said probe assembly relative to the bin of the hopper assembly.

7. The system of claim 6 wherein said restrictor include a pin extending through a hole in said elongated body and a cut-out formed in said elongated base at said upper end thereof, said base having first and second side walls defining the sides of said cut-out, said first and second side walls being configured to limit the lateral movement of said pin in said cut-out, limiting the range of lateral movement of said elongated body relative to said elongated base.

8. System for simultaneously determining the height of material dispensed into the bin of a hopper assembly in up to four different regions of the bin, the system comprising:
   four probe assemblies, each probe assembly having at least one measuring rod useful to measure the height of material in the bin;

four upwardly-extending, elongated bases having upper and lower ends, said lower end of said base being coupled to the hopper assembly in a manner that allows said base to be non-moveable relative to the bin; and four probe carriers, said first probe carrier being coupled to the hopper assembly proximate to the first region of the bin and configured to hold said first probe assembly in a fixed position relative to the bin so that said measuring rod thereof is disposed at a desired location in the first region of the bin and configured to measure the height of material therein, said second probe carrier coupled to the hopper assembly proximate to the second region of the bin and configured to hold said second probe assembly in a fixed position relative to the bin so that said measuring rod thereof is disposed at a desired location in the second region of the bin and configured to measure the height of material therein, said third probe carrier coupled to the hopper assembly proximate to the third region of the bin and configured to hold said third probe assembly in a fixed position relative to the bin so that said measuring rod thereof is disposed at a desired location in the third region of the bin and configured to measure the height of material therein, and said fourth probe carrier coupled to the hopper assembly proximate to the fourth region of the bin and configured to hold said fourth probe assembly in a fixed position relative to the bin so that said measuring rod thereof is disposed at a desired location in the fourth region of the bin and configured to measure the height of material therein, each said probe carrier having an elongated body and an elongated arm extending laterally outwardly therefrom and over the bin of the hopper assembly, said elongated arm of each said probe carrier being configured to carry said associated probe assembly so that said measuring rod thereof extends downwardly therefrom into the bin, said elongated body of each said probe carrier having a tubular lower portion slideably engaged with one of said elongated bases and being selectively rotatable relative thereto, wherein rotation of said elongated body of each said probe carrier causes said elongated arm thereof to pivot relative to said elongated base over the bin and reposition said associated measuring rod in any among a plurality of positions relative to the bin.

9. The system of claim 8 wherein said probe carriers are brackets welded to the bin.

10. The system of claim 9 wherein the bin includes a plurality of walls forming four corners, further wherein each region of the bin is a different quadrant of the bin located proximate to a different corner of the bin, further wherein each said probe carrier is a bracket coupled to a wall of the bin proximate to a different one of the corners of the bin.

11. The system of claim 8 wherein said probe carriers are each configured so that said respective probe assembly associated therewith is removable therefrom.

12. The system of claim 8 wherein said probe assemblies are radar-guided.

13. Method of estimating or determining the height of material in the bin of a hopper assembly of a hydraulic fracturing fluid blending unit as the material is being dispensed into the bin from another device during material delivery operations at a work site, the method comprising:

positioning the other device adjacent to the bin and securing the respective positions of the other device and the blending unit;

selectively positioning at least one radar-guided probe assembly over the bin so that the measuring rod of the probe assembly extends into the bin at a desired location, the measuring rod being useful to measure the height of material in the bin, each probe assembly being carried by an elongated arm of a probe carrier that extends laterally outwardly from an elongated body of the probe carrier and over the bin so that the measuring rod of the associated probe assembly extends downwardly into the bin, the elongated body of each probe carrier having a tubular lower portion slideably engaged with an upwardly-extending elongated base and being selectively rotatable thereto, the lower end of each base being coupled to the hopper assembly in a manner that allows the base to be non-moveable relative to the bin, wherein rotation of the elongated body of each probe carrier causes the elongated arm thereof to pivot relative to the associated elongated base over the bin and reposition the measuring rod of the associated probe assembly in any among a plurality of positions relative to the bin;

providing material into the bin from the other device on an ongoing basis;

as material is being provided into the bin, the probe assembly continually measuring the height of the material in the bin; and the probe assembly repeatedly communicating the material height measurements to an electronic controller.

14. The method of claim 13 further including pivoting each probe carrier relative to the associated base to position the associated probe assembly over the bin.

15. The method of claim 13 wherein the other device is a dual-belt device.

16. The method of claim 13 wherein the at least one radar-guided probe assembly includes four radar-guided probe assemblies, and as material is being provided into the bin, the probe assemblies simultaneously continually measuring the height of the material in the bin and repeatedly communicating the material height measurements to an electronic controller.

17. Method of determining and maintaining the height of material in the bin of a hopper assembly as the material is being dispensed into the bin during material delivery operations at a work site, the material being provided off the end of at least one conveyor belt from a material dispenser and either directly into the bin or into one or more device that ultimately dispenses the material into the bin, the method comprising:

the measuring rod of at least one probe assembly associated with the bin measuring the height of the material in the bin, the probe assembly being carried by an elongated arm of a probe carrier that extends outwardly from an elongated body of the probe carrier and over the bin so that the measuring ord of the associated probe assembly extends downwardly into the bin, the elongated body of each probe carrier having a tubular lower portion slideably engaged with an upwardly-extending elongated base and being selectively rotatable relative thereto, the lower end of each base being coupled to the hopper assembly in a manner that allows the base to be non-moveable relative to the bin, wherein rotation of the elongated body of each probe carrier causes the elongated arm thereof to pivot relative to the associated elongated base over the bin an reposition the measuring rod of the associated probe assembly in any among a plurality of positions relative to the bin;

electronically communicating the material height measurement to at least one electronic controller;

at least one electronic controller comparing the material height measurement to a desired target height level of material in the bin;

if the material height measurement is less than the desired target height level, at least one electronic controller reducing the amount of material discharged off the end of the conveyor belt;

if the material height measurement is greater than the desired target height level, at least one electronic controller increasing the amount of material discharged off the end of the conveyor; and repeating the above actions on an ongoing basis during the material delivery operations.

18. The method of claim 17 wherein the method is automated, further including discharging all personnel from the work site, whereby the height of material in the bin may be maintained without the involvement of personnel at the work site.

19. The method of claim 18 further including eliminating the need for any health, safety, environmental monitor personnel at the work site.

20. The method of claim 17 further including calculating and selecting the desired material target height level to be sufficient to avoid material overflowing out of the bin, wherein material will not overflow out of the bin.

21. The method of claim 20 wherein the bin includes at least two flow outlets through which the material may flow into at least one passageway, further including calculating and selecting the desired material target height level to be sufficient to cover the flow outlets, wherein the flow outlets will remain covered during the material delivery operations.

22. The method of claim 17 further including dispensing the material from the conveyor belt onto a dual-belt device and from the dual-belt device into the bin.

\* \* \* \* \*